United States Patent
Tabata et al.

(10) Patent No.: US 8,323,146 B2
(45) Date of Patent: Dec. 4, 2012

(54) CONTROL DEVICE FOR VEHICULAR DRIVE APPARATUS

(75) Inventors: Atsushi Tabata, Okazaki (JP); Tooru Matsubara, Toyota (JP); Yuji Iwase, Mishima (JP); Hiroyuki Shibata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 747 days.

(21) Appl. No.: 12/448,774

(22) PCT Filed: Jan. 28, 2008

(86) PCT No.: PCT/JP2008/051161
§ 371 (c)(1),
(2), (4) Date: Jul. 7, 2009

(87) PCT Pub. No.: WO2008/091007
PCT Pub. Date: Jul. 31, 2008

(65) Prior Publication Data
US 2010/0087287 A1    Apr. 8, 2010

(30) Foreign Application Priority Data
Jan. 26, 2007 (JP) .................... 2007-016876

(51) Int. Cl.
*B60K 1/02* (2006.01)
(52) U.S. Cl. ........................... 477/3; 477/107
(58) Field of Classification Search ................. 477/3, 7, 477/107, 110, 111, 181; 475/149, 151, 198, 475/205; 180/65.225, 65.235, 65.7
See application file for complete search history.

(56) References Cited

U.S. PATENT DOCUMENTS

| | | | |
|---|---|---|---|
| 6,370,463 B1 * | 4/2002 | Fujii et al. ................. 701/51 |
| 6,961,646 B2 * | 11/2005 | Soliman et al. ............. 701/51 |
| 7,115,069 B2 * | 10/2006 | Soliman et al. ............ 477/143 |
| 7,282,012 B2 * | 10/2007 | Soliman et al. ............ 477/143 |
| 2002/0065168 A1 | 5/2002 | Kima |
| 2006/0166784 A1 | 7/2006 | Tabata et al. |
| 2007/0063660 A1 | 3/2007 | Tabata et al. |

FOREIGN PATENT DOCUMENTS

| | | |
|---|---|---|
| JP | A-61-99745 | 5/1986 |
| JP | A-61-99753 | 5/1986 |
| JP | A-2-154859 | 6/1990 |
| JP | A-4-249666 | 9/1992 |
| JP | A-5-99304 | 4/1993 |
| JP | A-5-322015 | 12/1993 |
| JP | A-9-322307 | 12/1997 |

(Continued)

*Primary Examiner* — Justin Holmes
(74) *Attorney, Agent, or Firm* — Oliff & Berridge, PLC

(57) ABSTRACT

The present invention provides a control device for a vehicular drive apparatus with a structure of enabling the suppression of gearshift shock occurring during concurrent shifting executed of a first shifting portion and a second shifting portion. When the concurrent shifting are executed around the same time in which a down shift in one of a differential portion (first shifting portion) and an automatic shifting portion (second shifting portion) and an upshift in the other of them are executed, a first electric motor is caused to control a rotation speed of a second rotary element (sun gear). Thus, a shifting progress state upon the concurrent shifting is controlled. This causes shifting directions i.e., variation of the engine rotation speed in shifting of a shifting mechanism to be set in a unidirectional, enabling the suppression of gearshift shock.

18 Claims, 11 Drawing Sheets

FOREIGN PATENT DOCUMENTS

| | | |
|---|---|---|
| JP | A-2002-165304 | 6/2002 |
| JP | A-2005-206136 | 8/2005 |
| JP | A-2005-348532 | 12/2005 |
| JP | A-2006-273071 | 10/2006 |
| JP | A-2006-335127 | 12/2006 |
| JP | A-2006-341662 | 12/2006 |
| JP | A-2008-114624 | 5/2008 |
| JP | A-2008-114625 | 5/2008 |

* cited by examiner

|  | C0 | C1 | C2 | C3 | B0 | B1 | B2 | SPEED RATIO | STEP |
|---|---|---|---|---|---|---|---|---|---|
| 1st | ◎ | ○ |  |  |  |  | ○ | 3.683 | |
|  |  |  |  |  |  |  |  |  | 1.380 |
| 2nd(UPON ONLY STEP-VARIABLE) |  | ○ |  |  | ◎ |  | ○ | 2.669 | |
|  |  |  |  |  |  |  |  |  | 1.398 |
| 3rd | ◎ | ○ |  |  |  | ○ |  | 1.909 | |
|  |  |  |  |  |  |  |  |  | 1.380 |
| 4th(UPON ONLY STEP-VARIABLE) |  | ○ |  |  | ◎ | ○ |  | 1.383 | |
|  |  |  |  |  |  |  |  |  | 1.383 |
| 5th | ◎ | ○ |  | ○ |  |  |  | 1.000 | |
|  |  |  |  |  |  |  |  |  | 1.383 |
| 6th | ◎ |  |  | ○ |  | ○ |  | 0.661 | |
|  |  |  |  |  |  |  |  |  | 1.380 |
| 7th(UPON ONLY STEP-VARIABLE) |  |  |  | ○ | ◎ | ○ |  | 0.479 | |
| R(ENGINE) |  |  | ○ |  |  |  | ○ | 1.951 | TOTAL GEAR RATIO WIDTH |
| R(MOTOR) |  | ○ |  |  |  |  | ○ | 1.951 | |
| N |  |  |  |  |  |  | ○ |  | 7.687 |

○ ENGAGED  ◎ ENGAGED UPON STEP-VARIABLE RELEASED UPON CONTINUOUSLY-VARIABLE

| | C0 | C1 | C2 | B0 | B1 | B2 | B3 | SPEED RATIO | STEP |
|---|---|---|---|---|---|---|---|---|---|
| 1st | ◎ | ○ | | | ○ | | | 4.241 | |
| | | | | | | | | | 1.420 |
| 2nd(UPON ONLY STEP-VARIABLE) | | ○ | | ◎ | ○ | | | 2.986 | |
| | | | | | | | | | 1.415 |
| 3rd | ◎ | | ○ | | ○ | | | 2.111 | |
| | | | | | | | | | 1.420 |
| 4th(UPON ONLY STEP-VARIABLE) | | ○ | ◎ | | ○ | | | 1.482 | |
| | | | | | | | | | 1.487 |
| 5th | ◎ | ○ | ○ | | | | | 1.000 | |
| | | | | | | | | | 1.522 |
| 6th | ◎ | | ○ | | | ○ | | 0.657 | |
| | | | | | | | | | 1.420 |
| 7th(UPON ONLY STEP-VARIABLE) | | ○ | ◎ | | | ○ | | 0.463 | |
| | | | | | | | | | TOTAL GEAR RATIO WIDTH |
| R(ENGINE) | | ○ | | | | | ○ | 1.917 | |
| R(MOTOR) | | ○ | | | | ○ | | 1.917 | 9.164 |
| N | | ○ | | | | | | | |

○ ENGAGED   ◎ ENGAGED UPON STEP-VARIABLE RELEASED UPON CONTINUOUSLY-VARIABLE

CONTROL DEVICE FOR VEHICULAR DRIVE APPARATUS

TECHNICAL FIELD

The present invention relates to a control device for a vehicular drive apparatus having a first shifting portion and a second shifting portion that are capable of performing step-variable shifting among a plurality of gear positions. More particularly, it relates to a technology of controlling a shifting progress state for concurrent shifting executed around the same time in which shifting in the first shifting portion and shifting in the second shifting portions are executed.

BACKGROUND ART

There has been known a vehicular drive apparatus including first shifting portion and second shifting portion that are capable of performing step-variable shifting among a plurality of gear positions. For instance, a drive apparatus for a hybrid vehicle, disclosed in Patent Publication 1, corresponds to such a vehicle drive apparatus.

With such a vehicular drive apparatus disclosed in Patent Publication 1, a power transfer path, extending between an engine and drive wheels, has a first shifting portion that can be selectively shifted into a continuously variable shifting state, under which the first shifting portion is rendered operative as a continuously variable transmission, and a step-variable shifting state under which the first shifting portion is rendered operative as a step-variable transmission with two stages. Further, a second shifting portion is structured with a step-variable automatic transmission that allows the rotation of an output rotary member of the first shifting portion, i.e., the rotation of an input rotary member to which a drive force delivered from the engine is applied, to be shifted in multiple stages for transfer. With the first shifting portion placed in the continuously variable shifting state, the vehicular drive apparatus is rendered operative as a continuously variable transmission. With the first shifting portion placed in the step-variable shifting state, furthermore, the vehicular drive apparatus is rendered operative as a step-variable transmission with multiple stages having the number of gear positions greater than that of the second shifting portion.

[Patent Publication 1] Japanese Patent Publication No. 2005-206136

DISCLOSURE OF INVENTION

Subject to be Solved by the Invention

When rendering the vehicular drive apparatus disclosed in Patent Publication 1 operative as the step-variable transmission, the step-variable transmission is desired to be a transmission of close-ratio multiple stages having speed ratios variable in a wide range with the speed ratios being proximate to each other. In such a case, it is conceived for the vehicular drive apparatus to be structured in a multi-stage transmission upon increasing the number of power transfer paths through which the rotation is transferred i.e., transmitted in a manner as shown in Patent Publication 1. This increases the number of component parts with a likelihood of causing the vehicular drive apparatus to be large-sized as a whole. On the contrary, although it can be considered for the multi-stage transmission to be formed with a minimized number of component parts, a need arises to perform a shift control in a complicated mode with high precision. Unless such a shift control is properly performed, there is a likelihood of an increase in gearshift shock.

For instance, in performing the shift control between specified gear positions for accomplishing a further increased number of multiple stages, there may occur a need to execute concurrent shifting around the same time in which a downshift in one of the first shifting portion and second shifting portion and an upshift in the other one of the first shifting portion and second shifting portion are executed. In such a case, the downshift in one of the first shifting portion and second shifting portion causes an engine rotation speed to vary in a direction opposite to that in which the engine rotation speed is caused to vary during the upshift in the other one of the first shifting portion and second shifting portion. This requires the shift control to be performed in a complicated mode with high precision. Thus, unless a need arises to properly perform the shift control, it is likely that gearshift shock will increase.

The present invention is made in view of the above mentioned situation, and has an object to provide a control device for a vehicular drive apparatus which can suppress a gearshift shock i.e., shifting shock, when performing a concurrent shifting of a first shifting portion and a second shifting portion.

For achieving the above object, a first aspect of the present invention relates to (a) a control device of a vehicular drive apparatus having a first shifting portion and a second shifting portion, both operative to perform step-variable shifting among a plurality of gear positions. The control device of the vehicular drive apparatus is characterized in that (b) an electric motor is connected to at least one rotary element of the first shifting portion and the second shifting portion; and (c) during a concurrent shifting when a downshift in one of the first shifting portion and the second shifting portion and an upshift in the other of the first shifting portion and the second shifting portion are executed at the same time, a shifting progress state during the concurrent shifting is controlled by controlling a rotation speed of the rotary element.

In a second aspect of the present invention, in the first aspect, the shifting progress state of one of the first shifting portion and the second shifting portion with respect to the state of shifting progress of the other of the first shifting portion and the second shifting portion upon the concurrent shifting is controlled by controlling the rotation speed of the electric motor.

In a third aspect of the present invention, in the first or second aspect, the electric motor is controlled to commence and complete the shifting in the first shifting portion during an inertia phase of the shifting in the second shifting portion.

In a fourth aspect of the present invention, in one of the first to third aspects, a first electric motor is connected to the rotary element of the first shifting portion as the electric motor, and the first electric motor controls the rotation speed of the rotary element in the first shifting portion.

In a fifth aspect of the present invention, in the fourth aspect, the first electric motor is controlled depending on a variation in numbers of input rotation of the second shifting portion during the concurrent shifting.

During such operation, the first-motor rotation-speed control means 96 controls the first electric motor M1 depending on (in synchronism with) variation in the input rotation speed (the rotation speed N18 of the power transfer member 18) of the automatic shifting portion 20 during the concurrent shifting. For instance, the first-motor rotation-speed control means 96 allows the hybrid control means 84 to control the first-motor rotation speed NM1 so as to cause the engine rotation speed NE to vary in the same direction during the concurrent shifting.

That is, during the inertia phase, such a control is executed such that the engine rotation speed NE is caused to vary in the same direction as that in which the engine rotation speed NE varies in conjunction with the clutch-to-clutch shifting of the automatic shifting portion 20. Briefly, in nature, an opposing relationship is present during the concurrent shifting between a direction, in which the engine rotation speed NE varies in conjunction with the clutch-to-clutch shifting of the differential portion 11, and a direction in which the engine rotation speed NE varies in conjunction with the clutch-to-clutch shifting of the automatic shifting portion 20. Thus, the first-motor rotation speed NM1, i.e., the rotation speed of the sun gear S0, is controlled such that no engine rotation speed NE varies in an original varying direction caused by the clutch-to-clutch shifting of the differential portion 11.

In a seventh aspect of the present invention, in the fourth or fifth aspect, the first shifting portion and the second shifting portion are disposed in a power transfer path extended between an engine and drive wheels; the first shifting portion includes a differential mechanism for distributing an output of the engine to the first electric motor and an input rotary member of the second shifting portion; and the first electric motor is controlled to allow rotation speeds of the engine to vary in the same direction during the concurrent shifting.

In a eighth aspect of the present invention, in the sixth or seventh aspect, output torque of the engine is temporarily caused to drop during an inertia phase of the shifting of the second shifting portion.

In a ninth aspect of the present invention, in one of the first to eighth aspects, the shifting of the second shifting portion is a clutch-to-clutch shifting accomplished by disengaging a disengaging-side engaging device and engaging an engaging-side engaging device.

In a tenth aspect of the present invention, in one of the first to ninth aspects, the first shifting portion is operative to act as an electrically controlled continuously variable transmission in which controlling an operating state of the electric motor connected to the first shifting portion controls a differential state between an input rotation speed and an output rotation speed.

In an eleventh aspect of the present invention, in the tenth aspect, a shifting progress state in the concurrent shifting is controlled using the electric motor connected to the first shifting portion.

Effect of the Invention

According to the first aspect of the present invention, during the concurrent shifting when the downshift in one of the first shifting portion and the second shifting portion and the upshift in the other of the first shifting portion and the second shifting portion are executed at the same time, the shifting progress state is controlled by controlling the rotation speed of the rotary element. Consequently, the shift directions can be fixed to be unidirectional during the shifting in the vehicular drive apparatus, which can suppress the shifting shock. During the concurrent shifting, for instance, controlling the rotation speed of the rotary element by the electric motor enables a shifting progress state of the other of the first shifting portion and second shifting portion to be controlled with respect to a shifting progress state of one of the first shifting portion and the second shifting portion. This can execute the shifting of the other of the first shifting portion and second shifting portion conjunction with the shifting in one of the first shifting portion and second shifting portion, thereby suppressing the shifting shock.

Preferably, in the control device of a vehicular drive apparatus, the shifting progress state of one of the first shifting portion and the second shifting portion with respect to the state of shifting progress of the other of the first shifting portion and the second shifting portion upon the concurrent shifting is controlled by controlling the rotation speed of the electric motor. This can suppress the shifting shock.

Preferably, in the control device of a vehicular drive apparatus, the electric motor is controlled to commence and complete the shifting in the first shifting portion during an inertia phase of the shifting in the second shifting portion. This can conceal a variation in rotations by the shifting of the first shifting portion in a variation in rotations caused by the shifting of the second shifting portion, for thereby suppressing the shifting shock.

Preferably, in the control device of a vehicular drive apparatus, the first electric motor is connected to the rotary element of the first shifting portion as the electric motor, and the first electric motor controls the rotation speed of the rotary element in the first shifting portion. With such structure, the shifting progress state can be appropriately controlled for the concurrent shifting.

Preferably, in the control device of a vehicular drive apparatus, the first electric motor is controlled depending on the variation in numbers of the input rotation of the second shifting portion during the concurrent shifting. This can execute the shifting of the first shifting portion in a mode suited for the shifting progress state in the second shifting portion. That is, as the second shifting portion begins to perform the shifting, the input rotation speed of the second shifting portion begins to vary. Thus, controlling the rotation speed of the rotary element of the first shifting portion by the first electric motor enables the first shifting portion to execute the shifting in conformity to the state of progress of the shifting in the second shifting portion.

Preferably, in the control device of a vehicular drive apparatus, the first shifting portion and the second shifting portion are disposed in the power transfer path extended between the engine of the vehicle and the drive wheels, and the electric motor is controlled to allow rotation speeds of the engine to vary in the same direction during the concurrent shifting. Thus, no fluctuation occurs in the engine rotation speed during the concurrent shifting, and the single shifting is recognized for the vehicular drive apparatus as a whole, thereby precluding a driver from having an uncomfortable feeling.

Preferably, in the control device of a vehicular drive apparatus, the first shifting portion and the second shifting portion are disposed in a power transfer path extended between an engine and drive wheels, the first shifting portion includes a differential mechanism for distributing an output of the engine to the first electric motor and an input rotary member of the second shifting portion, and the first electric motor is controlled to allow rotation speeds of the engine to vary in the same direction during the concurrent shifting. Thus, no fluctuation occurs in the engine rotation speed during the concurrent shifting, and the single shifting is recognized for the vehicular drive apparatus as a whole, thereby precluding a driver from having an uncomfortable feeling. In addition, the engine rotation speed is controlled to vary unidirectionally i.e., in one direction using the differential action of the differential mechanism.

Preferably, in the control device of a vehicular drive apparatus, the output torque of the engine is temporarily caused to drop during an inertia phase of the shifting of the second shifting portion. This can decrease the transfer torque during the concurrent shifting, resulting in a further reduction in shifting shock.

Preferably, in the control device of a vehicular drive apparatus, wherein the shifting of the second shifting portion is a clutch-to-clutch shifting accomplished by disengaging a disengaging-side engaging device and engaging an engaging-side engaging device. This can appropriately suppress the shifting shock, when the clutch-to-clutch shifting, requiring a delicate timing control for the disengagement and the engagement to induce the occurrence of shifting shock, is executed concurrently with the shifting of the first shifting portion.

Preferably, in the control device of a vehicular drive apparatus, the first shifting portion is operative to act as an electrically controlled continuously variable transmission in which controlling an operating state of the electric motor connected to the first shifting portion controls a differential state between an input rotation speed and an output rotation speed. With such an arrangement, the first shifting portion and the second shifting portion form a continuously variable transmission, causing drive torque to be smoothly vary.

Preferably, in the control device of a vehicular drive apparatus, a shifting progress state in the concurrent shifting is controlled using the electric motor connected to the first shifting portion. This can easily cause the shifting directions of the vehicular drive apparatus during the shifting thereof to be unidirectional, thereby properly suppressing the shifting shock.

Preferably, in the control device of a vehicular drive apparatus, the first shifting portion is a differential portion including a differential mechanism having a first element connected to the engine, a second element connected to the first electric motor, and a third element connected to the power transfer member, and distributing an output of the engine to the first electric motor and the power transfer member. Further, the second shifting portion is an automatic shifting portion i.e., automatic transmission disposed in the power transfer path extending from the power transfer member to the drive wheels and functions as a step-variable automatic transmission.

Preferably, in the control device of a vehicular drive apparatus, the differential portion is operative to act as a continuously variable transmission by controlling an operating state of the first electric motor. With such a structure, the differential portion and the automatic shifting portion form the continuously variable transmission, thereby smoothly varying the drive torque. In addition, under a condition with controlling the differential portion so as to have a fixed speed ratio, the differential portion and the automatic shifting portion form a structure equivalent to the step-variable transmission. This allows the vehicular drive apparatus to have an overall speed ratio that can be varied step by step, thereby immediately obtaining the drive torque. In addition, the differential portion is controlled in the speed ratio thereof to be continuously varied, instead of the step by step variation to act as the step variable transmission.

Preferably, the differential mechanism is constructed of a planetary gear unit having three rotary elements operative to rotate relative to each other, and the first shifting portion includes an engaging device operative to allow one of the three rotary elements to be selectively connected to a non-rotary member and to cause two of the rotary elements to be selectively connected to each other.

More preferably, the differential mechanism is constructed of one set of planetary gear unit. The first element is a carrier of the planetary gear unit, the second element is a sun gear of the planetary gear unit, and the third element is a ring gear of the planetary gear unit. Such a structure reduces the differential mechanism in an axial direction.

More preferably, the differential mechanism includes a friction engaging device for selectively switching the differential mechanism into a differential state and a non-differential state. With such a structure, the differential mechanism allows the first shifting portion to selectively obtain an unlocked state, i.e., a continuously variable shifting state capable of performing a differential action, and a step-variable shifting state placed in a locked state to limit the differential action in which the first shifting portion is rendered operative to obtain a fixed speed ratio. In addition, the friction engaging device is operative to establish the following two states. The first state is a status wherein selectively engaging either two of the rotary elements of the differential mechanism to unitarily rotate with each other allows the shift shifting portion to have a speed ratio of "1". The second state is a status wherein connecting any one of the rotary elements of the differential mechanism to a non-rotary member allows the first shifting portion to act as a speed increasing mechanism with a speed ratio less than a value of "1". With such an arrangement, the differential mechanism is caused to function as a two-stage subsidiary transmission, increasing the number of gear positions without increasing an axial dimension.

More preferably, and an overall speed ratio of the drive apparatus is established based on a speed ratio of the differential portion and a speed ratio of the automatic shifting portion. Utilizing the speed ratio of the shifting portion can render a drive force in a wide range. This allows the electrically operated differential action of the differential mechanism to be controlled with further increased efficiency. Moreover, with the second electric motor being connected to the power transfer member, and the automatic shifting portion operating as a speed reduction transmission having a speed ratio with a value less than "1", it may suffice for the second electric motor to provide output torque that is lower than that of an output rotation member of the automatic shifting portion, enabling the miniaturization of the second electric motor.

More preferably, concurrent shifting determining means, second shift portion control means, inertia-phase determining means and first shift control means are provided. The concurrent shifting determining means determines if the concurrent shifting, in which the downshifting of one of the first shifting portion and the second shifting portion and the upshifting of other of the first shifting portion and the second shifting portion are concurrently executed, is determined. The second shift portion control means, when the concurrent shifting is determined by the concurrent shifting determining means, operated to execute the shifting of the second shift portion. The inertia-phase determining means determines the shifting under the inertia phase i.e., in the inertia phase of the second shifting portion. The first shifting portion control means operates to initiate and to complete the shifting of the first shifting portion during the inertia phase. Such a structure enables the shifting of the first shifting portion to be executed in an overlapping mode concurrent with the shifting of the second shifting portion during a shifting period thereof.

As used herein, the term "number or revolutions of rotation" refers to "rotation per unit time", i.e., "rotation speed (rpm)".

EXPLANATION OF REFERENCES

8: Engine
10, 110: Shifting mechanism (Vehicular drive apparatus)
11: Differential portion (First shifting portion)
16: Power distributing mechanism (Differential mechanism)
20, 114: Automatic shifting portion (Second shifting portion)
32: Drive wheel
80: Electronic control device
M1: First electric motor

BEST MODE FOR CARRYING OUT THE INVENTION

Hereunder, various embodiments of the present invention will be described below in detail with reference to the accompanying drawings.

Embodiment 1

Figures 1, 2:
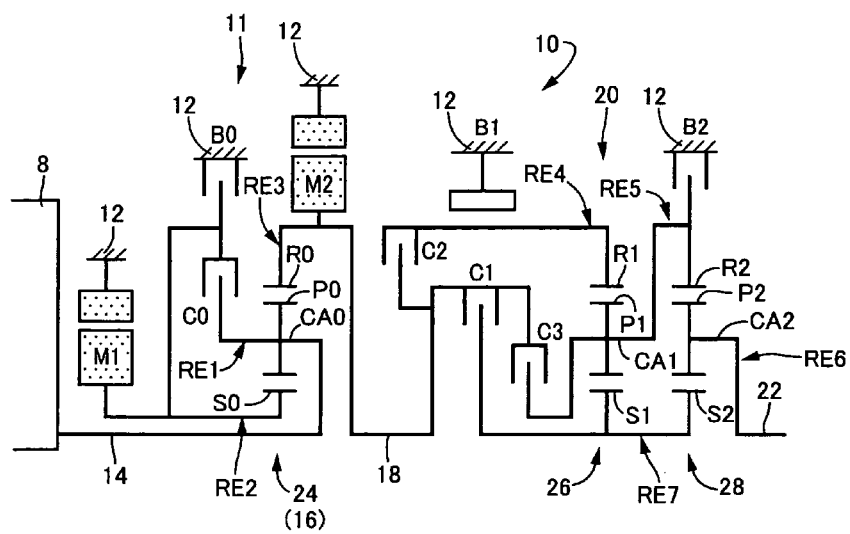
FIG. 1 is a schematic view showing an arrangement of a transmission mechanism of a drive apparatus of a hybrid vehicle to which the present invention is applicable.
FIG. 2 is a table indicating shifting actions of the transmission mechanism of FIG. 1 placed in a step-variable shifting state, in relation to different combinations of operating states of hydraulically operated frictional coupling devices to effect the respective shifting actions.

FIG. 1 is a skeleton view illustrating a shifting mechanism (power transfer device) 10 forming a part of a hybrid vehicle drive apparatus to which a control device of a first embodiment according to the present invention is applied. In FIG. 1, the shifting mechanism 10 includes: an input rotary member, i.e., an input shaft 14, mounted on a common axis in a transmission case (hereinafter referred to as a "case") acting as a non-rotary member mounted on a vehicle body, which is connected directly to an engine 8 or indirectly connected thereto via a pulsation absorbing damper (vibration damping device), not shown; a differential portion 11 acting as a first shifting portion or a continuously-variable shifting portion connected to the input shaft 14; a second shifting portion, i.e., an automatic shifting portion 20 connected to a power transfer path in series via a power transfer member (power transfer shaft) 18 between the differential portion 11 and drive wheels 32 (see FIG. 7) to function as a step-variable transmission; and an output rotary member, i.e., an output shaft 22 connected to the automatic shifting portion 20 in series to transfer an output of the same to a subsequent stage.

With such a shifting mechanism 10, the differential portion 11 and the automatic shifting portion 20 are structured in a concentric relation to be relatively large in an axial length and, hence, the shifting mechanism 10 is suitably applied to an FR (front-engine and rear-drive) vehicle to be longitudinally disposed in, for instance, a fore and aft direction of the vehicle. The shifting mechanism 10 is located in the power transfer path between the engine 8 and a pair of drive wheels 32 to transfer a vehicle drive force from the engine 8 to the pair of drive wheels 32 via a differential gear device (final speed-reduction gear unit) 30, forming a part of the power transfer path, and a pair of drive axles, etc. The engine 8 serves as a vehicle drive-force source and includes an internal combustion engine, such as a gasoline engine or a diesel engine, or an external engine, etc.

With the shifting mechanism 10 of the present embodiment, the engine 8 and the differential portion 11 are directly connected to each other. Such a direct connection may include a connection under which the engine 8 and the differential portion 11 are connected to each other with no intervening of a fluid-operated coupling device such as a torque converter or a fluid coupling unit, etc. A connection with the intervening of, for instance, the pulsation absorbing damper may be involved in the direct connection. In addition, the power transfer member 18, acting as the output rotary member, acts as an input rotary member of the automatic shifting portion 20. Moreover, the shifting mechanism 10 takes a symmetric structure with respect to an axis of the shifting mechanism 10 and, hence, a lower half of such a structure is omitted in the skeleton view of FIG. 1.

The differential portion 11 includes a first electric motor M1, a power distributing mechanism 16 in the form of a mechanical mechanism operative to allow the output of the engine 8, input to the input shaft 14, to be mechanically distributed and acting as a differential mechanism to distribute the output of the engine 8 to the first electric motor M1 and the power transfer member 18, and a second electric motor M2 arranged to unitarily rotate with the power transfer member 18. Also, the second electric motor M2 may be disposed in the power transfer path at any area between the power transfer member 18 and the drive wheels 32. With the present embodiment, the first and second electric motors M1 and M2 are so-called motor/generators even having electric-power generating functions. However, the first electric motor M1 includes an electric motor having at least a generator (electric-power generating) function to generate a reactive force and the second electric motor M2 includes an electric motor having at least a motor (electric motor) function to serve as a drive-force source to generate a drive force for running the vehicle.

The power distributing mechanism 16 mainly includes a planetary gear set 24 of a single pinion type having a given gear ratio ρ0 of approximately, for instance, "0.380", a switching clutch C0 and a switching brake B0. The planetary gear set 24 includes rotary elements such as a sun gear S0, planetary gears P0, a carrier CA0 carrying the planetary gears P0 such that the planetary gears P0 are rotatable about their axes and about the axis of the sun gear S0, and a ring gear R1 held in meshing engagement with the sun gear S0 through the planetary gears P0. With the sun gear S0 and the ring gear R0 supposed to have the numbers of gear teeth ZS0 and ZR0, respectively, the gear ratio ρ0 is expressed as ZS0/ZR0.

In the power distributing mechanism 16, the carrier CA0 is connected to the input shaft 14, i.e., the engine 8. The sun gear S0 is connected to the first electric motor M1 and the ring gear R0 is connected to the power transfer member 18. The switching brake B0 is disposed between the sun gear S0 and the casing 12 and the switching clutch C0 is disposed between the sun gear S0 and the carrier CA0. As both of the switching clutch C0 and the switching brake B0 are caused to disengage, i.e., if the switching clutch C0 and the switching brake B0 are switched to disengaging states, the sun gear S0, the carrier CA0 and the ring gear R0 forming the three elements of the planetary gear set 24 are made rotatable relative to each other. This allows the power distributing mechanism 16 to be operative for performing a differential action, i.e., the power distributing mechanism 16 is placed in a differential state in which the differential action is initiated.

With such an operation, the output of the engine 8 is distributed to the first electric motor M1 and the power transfer member 18, under which the first electric motor M1 is driven with a part of the distributed output of the engine 8 to generate electric energy for storage or used to rotatably drive the second electric motor M2. As a result, the differential portion 11 (power distributing mechanism 16) is placed in a so-called continuously variable shifting state (electrically-operated CVT state), under which the rotation of the power transfer member 18 can be continuously varied regardless of the engine 8 having a given rotation. That is, as the power distributing mechanism 16 is placed in the differential state, the differential portion 11 is placed in the continuously variable shifting state to allow a function to be performed as an electrically controlled continuously variable transmission. This allows a speed ratio γ0 (a ratio of a rotation speed NIN of the input shaft 14 to a rotation speed N18 of the power transfer member 18) to continuously vary from a minimal value γ0min to a maximal value γ0max.

As the switching clutch C0 or the brake B0 is switched to an engaging state under such a condition, the power distributing mechanism 16 is brought into a non-differential state under which the differential function is disenabled. More particularly, as the switching clutch C0 is caused to engage, the sun gear S0 and the carrier CA0 are unitarily connected to each other. Then, the power distributing mechanism 16 is placed in a connected state, i.e., a locked state in which all of the sun gear S0, the carrier CA0 and the ring gear R0, forming the three rotary elements of the planetary gear set 24, are caused to rotate in a unitarily rotation under a non-differential state disenabling differential action. This allows the differential portion 11 to be placed in the non-differential state. This results in a condition under which the rotation speed of the engine 8 and the rotation speed of the power transfer member 18 match each other. Thus, the differential portion 11 (power distributing mechanism 16) is placed in a non-continuously variable shifting state such as, for instance, a shifting state, i.e., a step-variable shifting state to function as a transmission with the speed ratio γ0 being fixed to "1".

As the switching brake B0 is caused to engage in place of the switching clutch C0, the sun gear S0 is connected to the casing 12. This allows the power distributing mechanism 16 to be placed in a non-differential state under which the sun gear S0 is placed in a non-rotatable state such that the differential portion 11 is also placed in the non-differential state. When this takes place, the ring gear R0 is caused to rotate at an increasing speed higher than that of the carrier CA0. Thus, the power distributing mechanism 16 is placed in the non-continuously variable shifting state in the form of, for instance, the fixed shifting state, i.e., the step-variable shifting state to function as a speed-increasing transmission with the speed ratio γ0 fixed at a value of approximately, for instance, "0.7" to be less than "1".

The switching clutch C0 and the switching brake B0 function as a differential-state switching device operative to selectively switch a shifting state of the differential portion 11 (power distributing mechanism 16) to a differential state, i.e., an unlocked state (uncoupling state) and a non-differential state, i.e., a locked state (coupling state). Under such a differential state, the differential portion 11 (power distributing mechanism 16) is placed in a differential state to act as an electrically controlled differential device, i.e., for instance, an electrically controlled continuously variable transmission with the speed ratio being continuously variable. Under such a non-differential state, in contrast, the differential portion 11 is placed in a non-continuously variable shifting state disenabling the electrically controlled continuously-variable shifting operation, i.e., a locked state under which, for instance, the speed ratio is locked in a fixed varying state, i.e., a fixed shifting state (non-differential state) under which the differential portion 11 is operative to act as a single-stage or multi-stage transmission with one or more than two kinds of fixed speed ratios.

Ultimately, the switching clutch C0 and the switching brake B0 function as a differential-action limiting device to cause the power distributing mechanism 16 to be placed in the non-differential state to limit the differential action such that the differential portion 11 is placed in the non-continuously variable shifting state. This limits the operation of the differential portion 11 acting as the electrically controlled differential device or the non-continuously variable transmission.

The automatic shifting portion 20 includes a first planetary gear set 26 of a single pinion type and a second planetary gear set 28 of a single pinion type to function as a four-speed step-variable automatic transmission. The first planetary gear set 26 has a first sun gear S1, first planetary gears P1, a first carrier CA1 supporting the first planetary gears P1 such that the first planetary gears P1 rotate about their axes and about the axis of the first sun gear S1, and a first ring gear R1 meshing with the first sun gear S1 through the first planetary gears P1. The first planetary gear set 26 has a given gear ratio ρ1 of approximately, for instance, "0.529". The second planetary gear set 28 has a second sun gear S2, second planetary gears P2, a second carrier CA2 supporting the second planetary gears P2 such that the second planetary gears P2 rotate about their axes and about the axis of the second sun gear S2, and a second ring gear R2 meshing with the second sun gear S2 through the second planetary gears P2. The second planetary gear set 28 has a given gear ratio $\rho 2$ of approximately, for instance, "0.372". Suppose the first sun gear S1, the first ring gear R1, the second sun gear S2 and the second ring gear R2 have the numbers of gear teeth ZS1, ZR1, ZS2 and ZR2, respectively, the gear ratios $\rho 1$ and $\rho 2$ are expressed as ZS1/ZR1 and ZS2/ZR2, respectively.

In the automatic shifting portion 20, the first and second sun gears S1 and S2 are unitarily connected to each other and selectively connected to the power transfer member 18 through the first clutch C1. The first carrier CA1 and the second ring gear R2, unitarily connected to each other, are selectively connected to the casing 12 through the second brake B2 and selectively connected to the power transfer member 18 through a third clutch C3. The first ring gear R1 is selectively connected to the casing 12 through the first brake B1 and selectively connected to the power transfer member 18 through the second clutch C2 while the second carrier CA2 is connected to the output shaft 22.

Thus, the automatic shifting portion 20 and the power transfer member 18 are selectively connected to each other through the first to third clutches C1, C2 and C3 used for establishing the gear position in the automatic shifting portion 20. In other words, the first to third clutches C1, C2 and C3 serve as input clutches of the automatic shifting portion 20 to function as a power-transfer-interrupting engaging device. This selectively establishes a power transfer enabling state and a power transfer interrupting state. Under such a power transfer enabling state, the power transfer path between the power transfer member 18 and the automatic shifting portion 20, i.e., between the differential portion 11 (power transfer member 18) and the drive wheels 32 is enabled to perform a power transfer. Under the power transfer interrupting state, the power transfer through such a power transfer path is disenabled. Upon engagement of at least one of the first, second and third clutches C1, C2 and C3, the power transfer path is placed in the power transfer enabling state. With all of the first, second and third clutches C1, C2 and C3 being disengaged, the power transfer path is placed in the power transfer interrupting state.

The switching clutch C0, the first to third clutches C1 to C3, the switching brake B0 and the first and second brakes B1 and B2 (hereinafter collectively referred to as clutches C and brakes B unless otherwise specified) serve as hydraulically operated friction engaging devices that are frequently used in a related art vehicular automatic transmission. Each of these friction engaging devices is comprised of wet-type multiple-disc clutches, each including a plurality of friction plates superimposed on one another to be pressed against each other by a hydraulic actuator, or band brakes each including a rotary drum and one or two bands wound around an outer circumferential surface of the rotary drum and having one end tightened with a hydraulic actuator. Each of the clutches C and the brakes B selectively couples adjacent component elements between which each of the clutches C and the brakes B intervenes.

With the shifting mechanism 10 of such a structure, the power distributing mechanism 16 includes the switching clutch C0 and the switching brake B0. The differential portion 11 placed in the fixed shifting state upon engaging any one of the switching clutch C0 and the switching brake B0, and the automatic shifting portion 20 rendered operative as the step-variable transmission, establish the step-variable shifting state. The differential portion 11 placed in the continuously variable shifting state upon disenabling the engaging operations of any one of the switching clutch C0 and the switching brake B0, and the automatic shifting portion 20 establish the continuously variable shifting state to allow the operation of the electrically controlled continuously variable transmission.

When the shifting mechanism 10 functions as the step-variable transmission with the differential portion 11 placed in the non-continuously variable shifting state, either one of the switching clutch C0 and the switching brake B0 is caused to engage and the first to third clutches C1 to C3 and the first and second brakes B1 and B2 are caused to selectively engage in combined operations shown in FIG. 2. This allows a forward-drive gear position in any one of a 1st-speed gear position (first gear position) to a 7th-speed gear position (seventh gear position), a reverse-drive gear position (reverse-drive shift position) or a neural position to be selectively established. With the forward-drive gear positions, the shifting mechanism 10 provides an overall speed ratio $\gamma T$ (a ratio of the rotation speed NIN of the input shaft 14 to the rotation speed NOUT of the output shaft 22), varying in a speed ratio between adjacent gear positions at a nearly equal ratio, in a stepwise fashion for each gear position. This allows a total speed ratio width (a ratio of a speed ratio $\gamma T1$ of the 1st-speed gear position to a speed ratio $\gamma T7$ of the 7th-speed gear position) to be widely obtained. The overall speed ratio $\gamma T$ of the shifting mechanism 10 represents a total speed ratio $\gamma T$ (=speed ratio $\gamma 0 \times$ speed ratio $\gamma A$) of the shifting mechanism 10 as a whole determined based on the speed ratio $\gamma 0$ of the differential portion 11 and the speed ratio $\gamma A$ (a ratio of the rotation speed N18 of the power transfer member 18 to the rotation speed NOUT of the output shaft 22) of the automatic shifting portion 20.

As indicated in the operation engagement diagram shown in FIG. 2, engaging the switching clutch C0, the first clutch C1 and the second brake B2 results in the establishment of a 1st-speed gear position with a speed ratio $\gamma T1$ having the maximum value of approximately, for instance, "3.683". Engaging the switching brake B0, the first clutch C1 and the second brake B2 results in the establishment of a 2nd-speed gear position with a speed ratio $\gamma T2$ of approximately, for instance, "2.669" less than a value of the speed ratio $\gamma T1$. Engaging the switching clutch C0, the first clutch C1 and the first brake B1 results in the establishment of a 3rd-speed gear position with a speed ratio $\gamma T3$ of approximately, for instance, "1.909" less than a value of the 2nd-speed gear position. Engaging the switching brake B0, the first clutch C1 and the first brake B1 results in the establishment of a 4th-speed gear position with a speed ratio $\gamma T4$ of approximately, for instance, "1.383" less than a value of the 3rd-speed gear position. Engaging the switching clutch C0, the first clutch C1 and the third clutch C3 results in the establishment of a 5th-speed gear position with a speed ratio $\gamma T5$ of approximately, for instance, "1.000" less than a value of the 4th-speed gear position. Engaging the switching clutch C0, the third clutch C3 and the first brake B1 results in the establishment of a 6th-speed gear position with a speed ratio $\gamma T6$ of approximately, for instance, "0.661" less than a value of the 5th-speed gear position.

Engaging the switching brake B0, the third clutch C3 and the first brake B1 results in the establishment of a 7th-speed gear position with a speed ratio $\gamma T7$ of approximately, for instance, "0.479" less than a value of the 6th-speed gear position. Further, engaging the second clutch C2 and the second brake B2 during a drive mode of the engine 8 and engaging the first clutch C1 and the second brake B2 during a drive mode of the second electric motor M2 results in the establishment of a reverse-drive gear position with a speed ratio γR of approximately, for instance, "1.951" lying at a value between the 2nd-speed and 3rd-speed gear positions. The reverse-drive gear position is normally established when the differential portion 11 is placed in the continuously variable shifting state. Furthermore, when attempting to obtain the neutral "N" state, for instance, only the second brake B2 is caused to engage.

As will be understood from the foregoing description and the illustration in FIG. 2, the shifting mechanism 10 of the present embodiment is arranged to establish a shifting in forward-drive seven gear positions. This is accomplished in combination with the shifting in two stages, achieved on a "clutch-to-clutch shifting" initiated upon disengaging one of or engaging the other one of the switching clutch C0 and the switching brake B0, and the shifting in four stages achieved on the "clutch-to-clutch shifting" effectuated by disengaging one of or engaging the other one of the first to third clutches C1 to C3 and the first and second brakes B1 and B2.

That is, mainly causing the first shifting portion (differential portion 11) to perform the clutch-to-clutch shifting allows the shifting to be executed between the 1st-speed and 2nd-speed gear positions, between the 3rd-speed and 4th-speed gear positions and between the 6th-speed and 7th-speed gear positions. With the first shifting portion (differential portion 11) mainly caused to perform the clutch-to-clutch shifting, the shifting can be executed between the 5th-speed and 6th-speed gear positions. The shifting between the 2nd-speed and 3rd-speed gear positions and the shifting between the 4th-speed and 5th-speed gear positions can be accomplished by simultaneously executing the shifting around the same shifting period.

With the differential portion 11 placed in the continuously variable shifting state to cause the shifting mechanism 10 to function as the continuously variable transmission, both the switching clutch C0 and the switching brake B0 are caused to disengage. This allows the differential portion 11 to function as the continuously variable transmission while causing the automatic shifting portion 20, connected to the differential portion 11 in series, to function as the step-variable transmission with four forward-drive gear positions. With the gear positions automatically selected from the four forward-drive gear positions, the automatic shifting portion 20 can obtain a stepless speed ratio width in a selected gear position M so as to continuously vary the total speed ratio γT as a whole regardless of a stepwise variation in a speed ratio γA. That is, the rotation speed input to the automatic shifting portion 20, i.e., the rotation speed of the power transfer member 18 is caused to vary in a stepless fashion. This results in a capability of causing the shifting mechanism 10 to obtain the total speed ratio γT in a stepless fashion.

That is, when the shifting mechanism 10 functions as the continuously variable transmission, both the switching clutch C0 and the switching brake B0 are caused to disengage. Under such states, the speed ratio γ0 of the differential portion 11 is controlled to lie at the total speed ratio γT that is continuously variable in a stepless fashion across adjacent gear positions for the gear positions at the 1st-speed, the 2nd-speed, the 3rd-speed and the 4th-speed of the automatic shifting portion 20. This allows the shifting mechanism 10 as a whole to have the total speed ratio γT in a continuously variable fashion.

Figure 3:
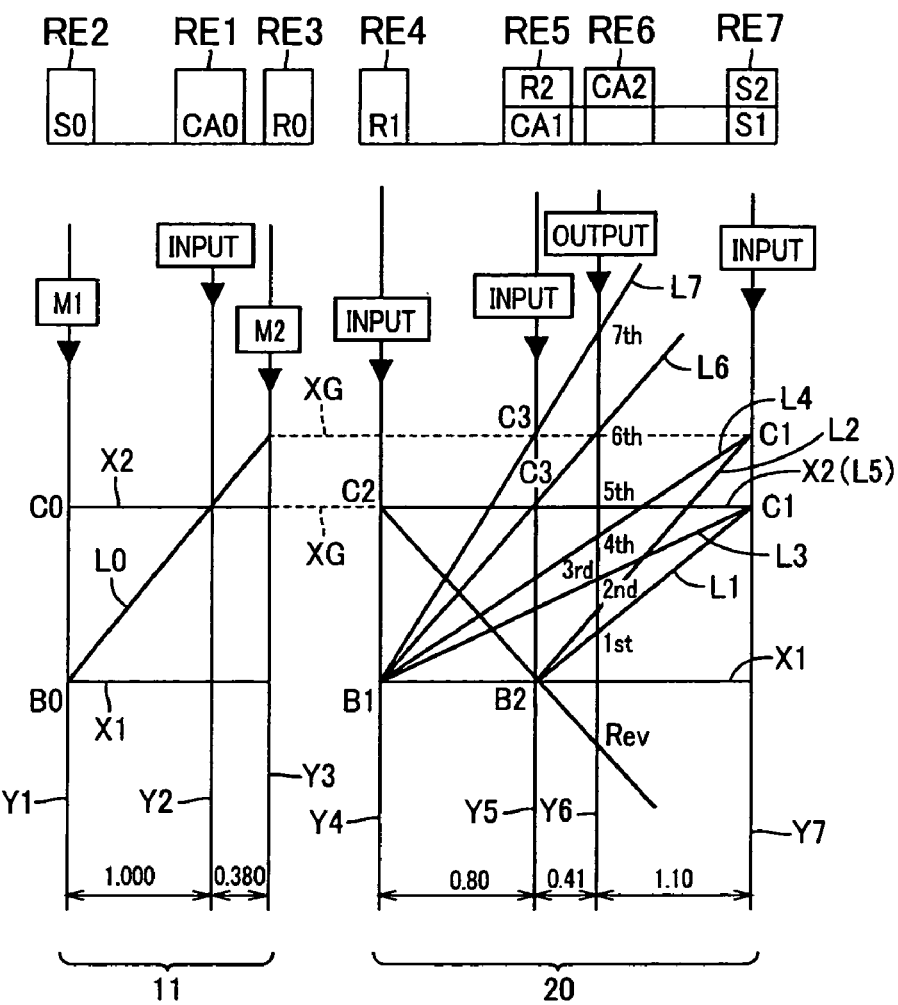
FIG. 3 is a collinear chart indicating relative rotating speeds of the transmission mechanism of FIG. 1 placed in the step-variable shifting state, in different gear positions of the transmission mechanism.

FIG. 3 shows a collinear chart for enabling the correlations among the rotation speeds of the rotary elements to be plotted on linear lines. The rotary elements take different connecting states depending on the gear positions in the shifting mechanism 10 composed of the differential portion 11, functioning as the continuously-variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the relationships of the planetary gear sets 24, 26, 28 in terms of the gear ratios ρ, and the vertical axis representing the relative rotation speeds of the rotary elements. Among horizontal lines, the lowermost horizontal line X1 indicates a zeroed rotation speed and an upper horizontal line X2 indicates a relative rotation speed of "1.0", i.e., a rotation speed NE of the engine 8 connected to the input shaft 14 and a horizontal line XG, shown by a broken line, indicates the rotation speed of the power transfer member 18.

Further, three vertical lines Y1, Y2 and Y3, corresponding to the three elements of the power distributing mechanism 16 forming the differential portion 11, represent, from the left in order, relative rotation speeds of the sun gear S0 corresponding to the second rotary element (second element) RE2, the carrier CA0 corresponding to the first rotary element (first element) RE1, and the ring gear R0 corresponding to the third rotary element RE3, respectively. Distances among these vertical lines are determined based on the gear ratio ρ0 of the planetary gear set 24. Further, five vertical lines Y4, Y5, Y6 and Y7 for the automatic shifting portion 20 represent, from the left in order, relative rotation speeds of the first ring gear R1 corresponding to the fourth rotary element (fourth element) RE4, the first carrier CA1 and the second ring gear R2 corresponding to the fifth rotary element (fifth element) RE5 and connected to each other, the second carrier CA2 corresponding to the sixth rotary element (sixth element) RE6, and the first and second sun gears S1 and S2 corresponding to the seventh rotary element (seventh element) RE7 and connected to each other, respectively. Distances among the vertical lines are determined based on the gear ratios ρ1 and ρ2 of the first and second planetary gear sets 26 and 28.

In the relationships among the vertical axes on the collinear chart, if a space between the sun gear and the carrier is set to a distance corresponding to "1", then, the space between the carrier and the ring gear is set to a distance corresponding to the gear ratio ρ. That is, for the differential portion 11, the space between the vertical lines Y1 and Y2 is set to a distance corresponding to "1" and the space between the vertical lines Y2 and Y3 is set to a distance corresponding to the gear ratio ρ0. For the automatic shifting portion 20, the space between the sun gear and the carrier is set to the distance corresponding to "1" and the space between the carrier and the ring gear is set to the distance corresponding to the gear ratio ρ for each of the first and second planetary gear sets 26 and 28.

To describe such relationships with reference to the collinear chart shown in FIG. 3, the shifting mechanism 10 of the present embodiment allows the power distributing mechanism 16 (differential portion 11) to operate as follows. That is, the first rotary element RE1 (carrier CA0) of the planetary gear set 24 is connected to the input shaft 14, i.e., the engine 8 and selectively connected to the second rotary element RE2 (sun gear S0) through the switching clutch C0. The second rotary element RE2 is connected to the first electric motor M1 and selectively connected to the casing 12 through the switching brake B0. The third rotary element RE3 (ring gear R0) is connected to both the power transfer member 18 and the second electric motor M2 to transfer (input) a rotary motion of the input shaft 14 to the automatic shifting portion 20 through the power transfer member 18. When this takes place, an inclined linear line L0 passing across an intersecting point between the lines Y2 and X2 represents the correlation between the rotation speed of the sun gear S0 and the rotation speed of the ring gear R0.

Disengaging, for instance, the switching clutch C0 and the switching brake B0 results in the switching to the continuously variable shifting state (differential state) for the first to third rotary elements RE1 to RE3 to rotate relative to each other, i.e., the continuously variable shifting state (differential state) under which at least, for instance, the second and third rotary elements RE2 and RE3 are rendered operative to rotate at speeds different from each other. When this takes place, controlling the rotation speed of the first electric motor M1 results in an effect of increasing or decreasing the rotation speed of the sun gear S0 as indicated by an intersecting point between the linear line L0 and the vertical line Y1. If the rotation speed of the ring gear R0, bound with the vehicle speed V indicated by an intersecting point between the linear line L0 and the vertical line Y3, is kept nearly constant, then, the rotation speed of the carrier CA0, i.e., the engine rotation speed NE, which is represented by an intersecting point between the linear line L0 and the vertical line Y2, is caused to increase or decrease.

As the switching clutch C0 is caused to engage with a resultant connection between the sun gear S0 and the carrier CA0, the power distributing mechanism 16 is placed in the non-differential state. Under such a state, the three rotary elements RE1, RE2 and RE3 are caused to unitarily rotate with a resultant incapability of causing the second and third rotary elements RE2 and RE3 to rotate at speeds different from each other. With such operation, the linear line L0 is aligned with the horizontal line X2 so that the power transfer member 18 is caused to rotate at the same speed as the engine rotation speed NE. Further, as the switching brake B0 is caused to engage with the sun gear S0 being coupled to the casing 12, the power distributing mechanism 16 causes the rotation of the second rotary element RE2 to be halted and placed in the non-differential state. Under such a state, the linear line L0 lies in a state as shown in FIG. 3 to cause the differential portion 11 to function as the speed-increasing mechanism. An intersecting point between the linear line L0 and the vertical line Y3 represents the rotation speed of the ring gear R0, i.e., the rotation speed of the power transfer member 18, which is input to the automatic shifting portion 20 at an increased speed higher than the engine rotation speed NE.

In the automatic shifting portion 20, the fourth rotary element RE4 is selectively connected to the power transfer member 18 through the second clutch C2 and selectively connected to the casing 12 through the first brake B1. The fifth rotary element RE5 is selectively connected to the power transfer member 18 through the third clutch C3 and selectively connected to the casing 12 through the second brake B2. The sixth rotary element RE6 is connected to the output shaft 22 and the seventh rotary element RE7 is selectively connected to the power transfer member 18 through the first clutch C1.

As shown in FIG. 3, the automatic shifting portion 20 allows the switching clutch C0, the first clutch C1 and the second brake B2 to engage such that the output shaft 22 has the rotation speed at a 1st-speed. This is plotted on an intersecting point between an inclined linear line L1, passing across an intersecting point between the vertical line Y7, representing the rotation speed of the seventh rotary element RE7, and the horizontal line X2 and an intersecting point between the vertical line Y5, representing the rotation speed of the fifth rotary element RE5, and the horizontal line X1, and the vertical line Y6 representing the rotation speed of the sixth rotary element RE6 connected to the output shaft 22. Likewise, the rotation speed of the output shaft 22 at a 2nd-speed is plotted on an intersecting point between an inclined linear line L2, determined upon engagements of the switching brake B0, the first clutch C1 and the second brake B2, and the vertical line Y6 representing the rotation speed of the sixth rotary element RE6 connected to the output shaft 22. The rotation speed of the output shaft 22 at a 3rd-speed is plotted on an intersecting point between an inclined linear line L3, determined upon engagements of the switching clutch C0, the first clutch C1 and the first brake B1, and the vertical line Y6 representing the rotation speed of the sixth rotary element RE6 connected to the output shaft 22.

The rotation speed of the output shaft 22 at a 4th-speed is plotted on an intersecting point between a linear line L4, determined upon engagements of the switching brake B0, the first clutch C1 and the first brake B1, and the vertical line Y6 representing the rotation speed of the sixth rotary element RE6 connected to the output shaft 22. The rotation speed of the output shaft 22 at a 5th-speed is plotted on an intersecting point between a horizontal line L5, determined upon engagements of the switching clutch C0 and the first and third clutches C1 and C3, and the vertical line Y6 representing the rotation speed of the sixth rotary element RE6 connected to the output shaft 22. The rotation speed of the output shaft 22 at a 6th-speed is plotted on an intersecting point between an inclined line L6, determined upon engagements of the switching clutch C0, the third clutch C3 and the first brake B1, and the vertical line Y6 representing the rotation speed of the sixth rotary element RE6 connected to the output shaft 22. The rotation speed of the output shaft 22 at a seventh-speed is plotted on an intersecting point between an inclined line L7, determined upon engagements of the switching brake B0, the third clutch C3 and the first brake B1, and the vertical line Y6 representing the rotation speed of the sixth rotary element RE6 connected to the output shaft 22.

As a result of the switching clutch C0 being caused to engage for the 1st-speed, the 3rd-speed, the 5th-speed and the 6th-speed, the fourth rotary elements RE4, the fifth rotary elements RE5 or the seventh rotary elements RE7 is applied with the drive force from the differential portion 11, i.e., the power distributing mechanism 16 at the same speed as the engine rotation speed NE. As a result of the switching brake B0 being caused to engage in place of the switching clutch C0 for the 2nd-speed, the 4th-speed and the 7th-speed, the drive force is input from the differential portion 11 to the fifth rotary element RE5 or the seventh rotary element RE7 at a rotation speed higher than the engine rotation speed NE.

Figure 4:
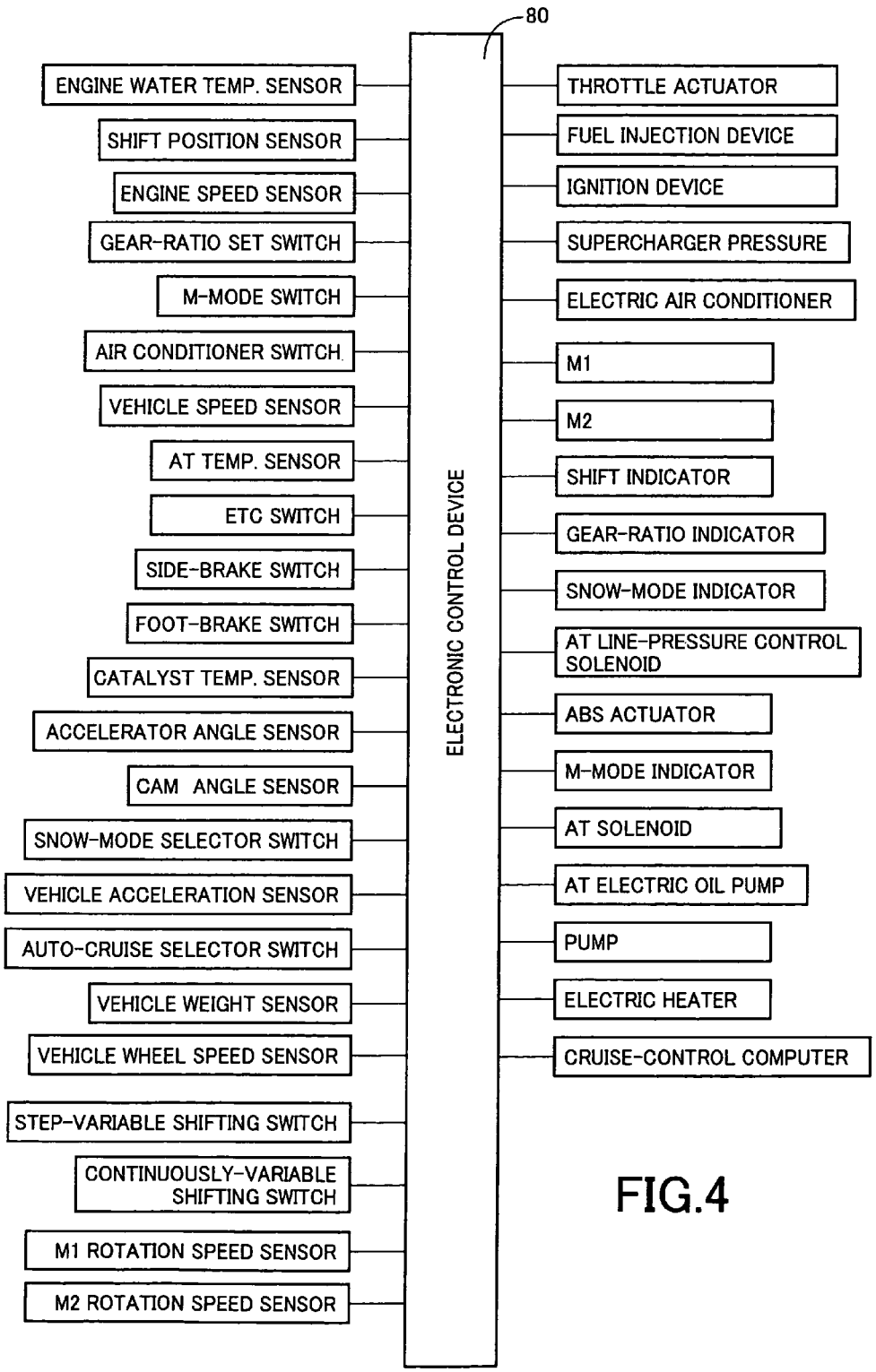
FIG. 4 is a view indicating input and output signals of a control apparatus in the form of an electronic control device constructed according to a first embodiment of this invention to control the drive apparatus of FIG. 1.

FIG. 4 exemplarily shows signals applied to or signals output from an electronic control device 80 for controlling the shifting mechanism 10 of the present embodiment. The electronic control device 80 includes a so-called microcomputer incorporating a CPU, a ROM, a RAM and an input/output interface, etc. The microcomputer performs signal processing in accordance with programs preliminarily stored in the ROM upon utilizing a temporarily storing function of the RAM. This allows drive controls to be executed for hybrid drive controls, related to the engine 8 and the first and second electric motors M1 and M2, and shifting control for the automatic shifting portion 20 etc.

The electronic control device 80 is connected to various sensors and switches as shown in FIG. 4 to receive various signals including: a signal representing an engine coolant water temperature TEMPW; a signal representing the number of operations of a shift lever 52 (see FIG. 6) placed in a shift position PSH and a position "M"; a signal representing the engine rotation engine rotation speed NE representing the rotation speed of the engine 8; a signal representing a gear-ratio setting value; a signal commanding an M-mode (manually shifting drive mode); a signal representing an air conditioner being placed under operation; a signal representing the vehicle speed V corresponding to the rotation speed (hereinafter referred to as "output-shaft rotation speed") NOUT of the output shaft 22; a signal representing a working oil temperature THOIL of the automatic shifting portion 20; a signal representing a side brake being placed under operation; a signal representing a foot brake being depressed in operation; a signal representing a temperature of a catalyst; and a signal representing an accel-opening θACC representing a depressed stroke of an accelerator pedal corresponding to an output demanded value required by a driver, etc.

Figure 7:
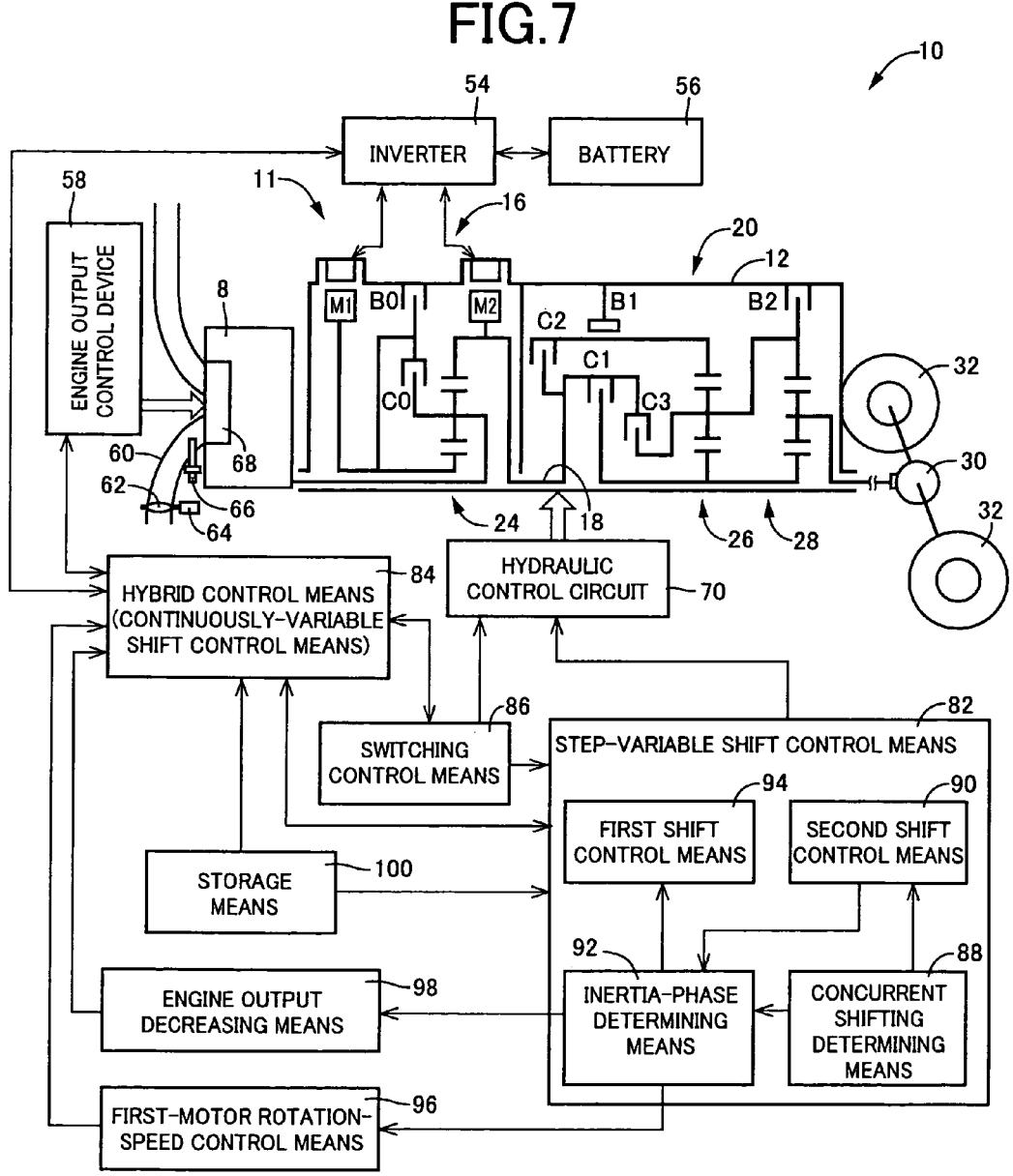
FIG. 7 is a functional block diagram illustrating major control functions of the electronic control device of FIG. 4.

Aside from the signals described above, other signals include: a signal representing a cam angle; a signal representing a snow mode being set; a signal representing a fore and aft acceleration G of the vehicle; a signal representing an auto-cruising mode being selected; a signal representing a weight of the vehicle; signals representing wheel speeds of the respective drive wheels; a signal representing the presence or absence of a step-variable switching operation for the switching the differential portion 11 (power distributing mechanism 16) to the step-variable shifting state (locked state) to cause the shifting mechanism 10 to function as the step-variable transmission; a signal representing the presence or absence of a continuously-variable switching operation for switching the differential portion 11 (power distributing mechanism 16) to the continuously variable-shifting state (differential state) to cause the shifting mechanism 10 to function as the continuously variable transmission; a signal representing a rotation speed NM1 of the first electric motor M1 (hereinafter referred to as "first-motor rotation speed NM1"); a signal representing a rotation speed NM2 of the second electric motor M2 (hereinafter referred to as "second-motor rotation speed NM2"); and a signal representing a state of charge (charging state) SOC of a battery 56 (see FIG. 7).

The electronic control device 80 applies an engine output control device 58 (see FIG. 5) to control an engine output with control signals including, for instance: a drive signal applied to a throttle actuator 64 for controlling a throttle-valve opening θ$_{TH}$ of an electronic throttle valve 62 disposed in an air-intake pipe 60 of the engine 8; a fuel-supply quantity signal applied to a fuel injection device 66 for controlling a quantity of fuel supplied to an air-intake pipe 60 or a cylinder of the engine 8; an ignition signal applied to an ignition device 68 for commanding an ignition timing of the engine 8; a supercharge-pressure regulating signal for regulating a supercharge pressure; an electric-motor driving air-conditioner drive signal for actuating an electric-motor driven air conditioner; a command signal commanding the first and second electric motors M1 and M2 to be operated; a shift-position (operated position) display signal for actuating a shift indicator; and a gear-ratio display signal for indicating the selected gear ratio, etc.

Aside from these control signals, other output signals include: a snow-mode display signal for providing a display of the snow mode being selected; an ABS actuating signal for actuating an ABS actuator to prevent the drive wheels from slipping during braking; an M-mode display signal for providing a display of the M-mode being selected; valve command signals for activating electromagnetic valves incorporated in a hydraulic control circuit 70 (see FIGS. 5 and 7) for controlling hydraulic actuators of the hydraulically operated friction engaging devices of the differential portion 11 and the automatic shifting portion 20; a signal for causing a regulator valve (pressure regulator valve) incorporated in the hydraulic pressure control circuit 70 to regulate a line pressure PL; a drive command signal for operating an electric oil pump acting as a hydraulic pressure source for an original pressure to be regulated at the line pressure PL; a signal for driving an electric heater; and a signal applied to a cruise-control computer, etc.

Figure 5:
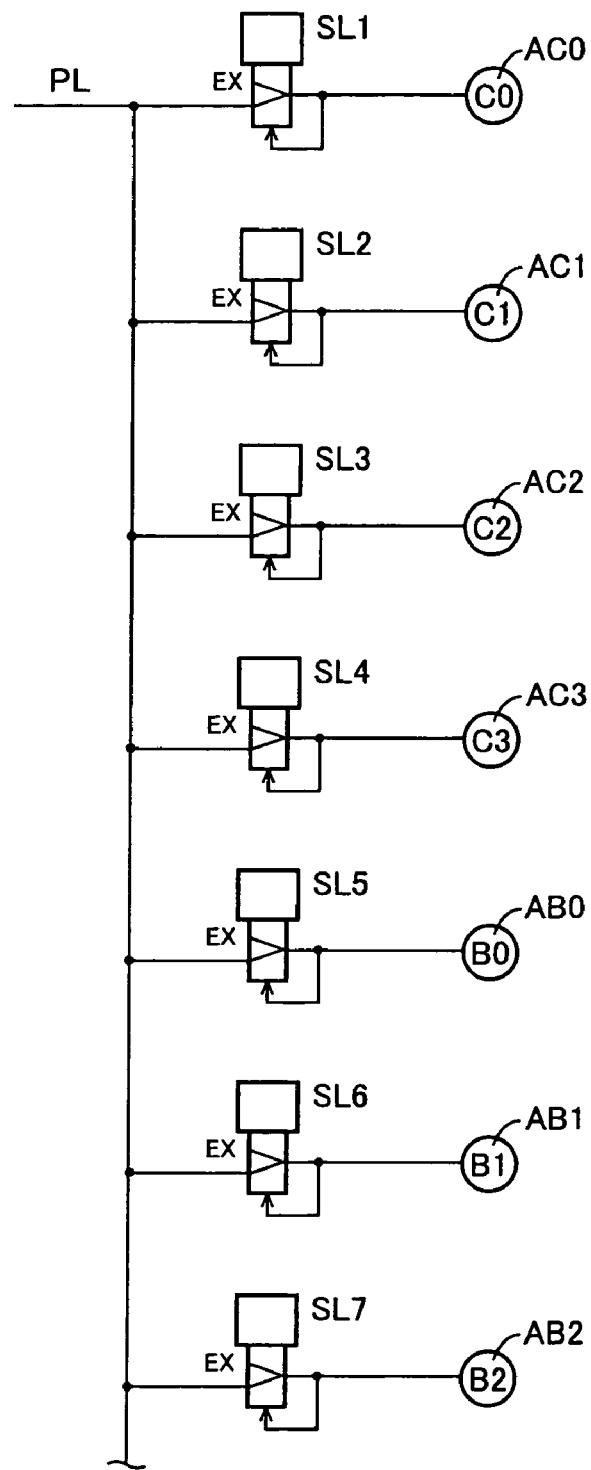
FIG. 5 is an example of a circuit diagram related to linear solenoid valves for controlling hydraulic actuators for clutches C and brakes B of a hydraulic control circuit.

FIG. 5 is a circuit diagram related to linear solenoid valves SL1 to SL7 for controlling operations of hydraulic actuators (hydraulic cylinders) AC0, AC1, AC2, AC3, AB0, AB1 and AB2 of the clutches C and the brakes B among components parts of the hydraulic control circuit 70.

In FIG. 5, the linear solenoid valves SL1 to SL7 regulate the hydraulic line pressure PL in response to the command signals delivered from the electronic control device 80 to engaging pressures PC0, PC1, PC2, PC3, PB0, PB1 and PB2, which are directly applied to the hydraulic actuators AC0, AC1, AC2, AC3, AB0, AB1 and AB2, respectively. For instance, a relief-type regulator valve (regulator valve) is arranged to regulate an original pressure in the form of a hydraulic pressure produced by an electric oil pump or a mechanical oil pump, rotatably driven by the engine 8, to obtain the hydraulic line pressure PL regulated to a value depending on the engine load or the like expressed in terms of the accel-opening θACC or the throttle-valve opening θTH.

The linear solenoid valves SL1 to SL7, basically formed in the same structures, are independently energized or deenergized by the electronic control device 80. This controllably and independently regulates the hydraulic pressures of the hydraulic actuators AC0, AC1, AC2, AC3, AB0, AB1 and AB2, respectively, for controlling the engaging pressures PC0, PC1, PC2, PC3, PB0, PB1 and PB2 of the clutches C and the brakes B, respectively. Upon engaging predetermined engaging devices in a manner shown in, for instance, the engaging operation table in FIG. 2, the shifting mechanism 10 is established in each of the gear positions. During shifting control of the shifting mechanism 10, further, the so-called clutch-to-clutch control is performed for the engagements and the disengagements of, for instance, the clutches C and the brakes B involved in the shifting to be concurrently controlled.

Figure 6:
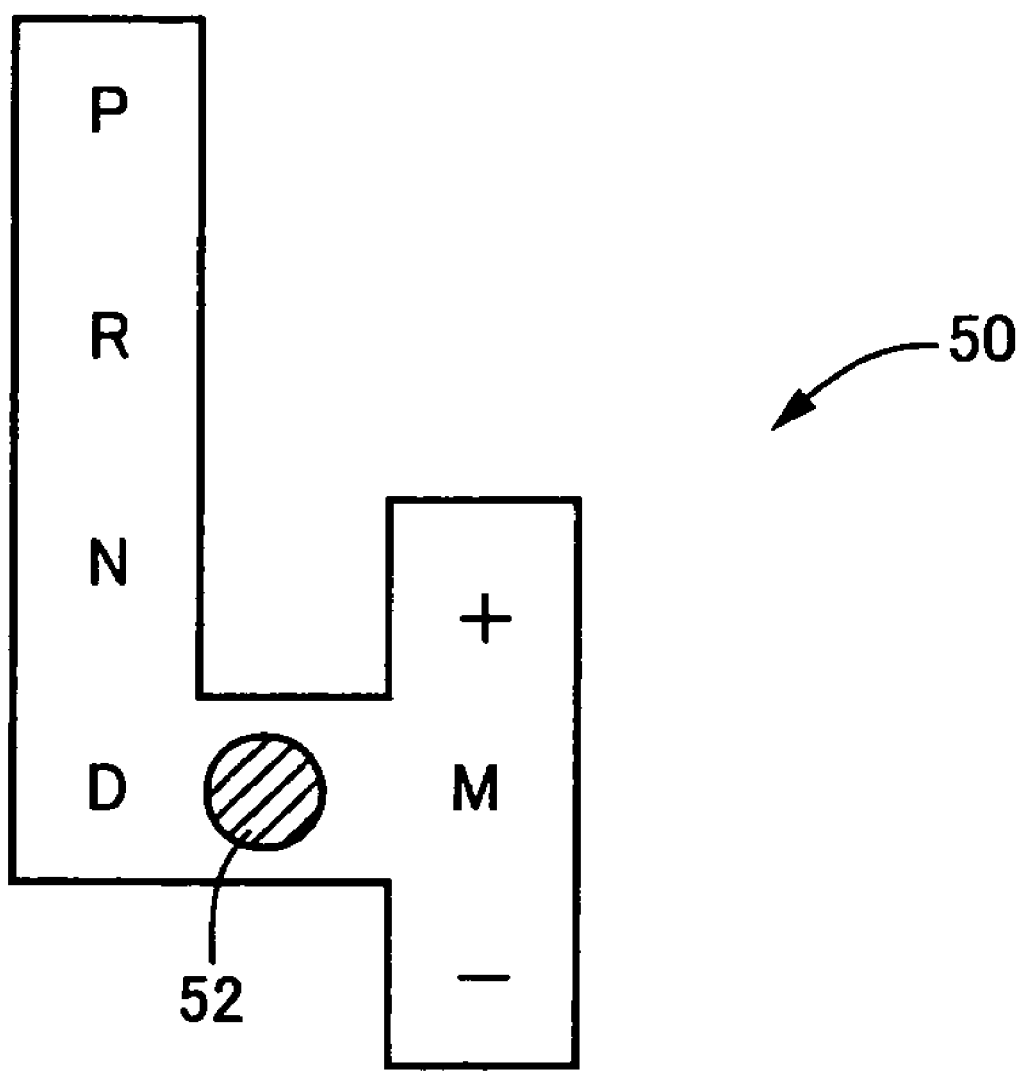
FIG. 6 is a view showing an example of a manually operated shifting device including a shift lever and operable to select one of a plurality of shift positions.

FIG. 6 is a view showing one example of a shift operating device 50 in the form of a switching device for switching the shift positions PSH of plural kinds in artificial manipulations. The shift operating device 50 includes a shift lever 52 mounted in an area laterally adjacent to, for example, a driver's seat to be operated for selecting one of the shift positions PSH of the plural kinds.

The shift lever 52 is manually operated in the following positions. These positions include: a parking position "P (Parking)" placed in a neutral state, i.e., a neutral condition under which none of the engaging devices such as the clutches C1 to C3 are caused to engage in the shifting mechanism 10, i.e., the power transfer path of the automatic shifting portion 20 is interrupted to lock the output shaft 22 of the automatic shifting portion 20; a reverse-drive running position "R (Reverse)" for the vehicle to run in the reverse drive; a neutral position "N (Neutral)" under which the shifting mechanism 10 is placed in a neutral state with the power transfer path being interrupted; a forward-drive automatic-shift running position "D (Drive)"; or a forward-drive manual-shift running position "M (Manual)".

In conjunction with the manual operation of the shift lever 52 shifted to each of the shift positions PSH, for instance, the hydraulic control circuit 70 is electrically switched to establish each of the gear positions in the reverse-drive gear position "R", the neutral position "N" and the forward-drive automatic-shift running position "D" in a manner as shown in the engagement operation table in FIG. 2.

When, for instance, the "D" position is selected by the operation of the shift lever 52, an automatic switching control is executed in accordance with the preliminarily stored shifting map and the switching map (see FIG. 8) for the shifting state of the shifting mechanism 10, while the continuously variable shifting control is executed for the power distributing mechanism 16 and the automatic shifting portion 20 executes the automatic shifting control. The "D" position is a shift position for selecting an automatic-shift drive mode (automatic mode) initiated in a control routine under which the shifting mechanism 10 executes the automatic shift control.

When the "M" position the shift lever 52 is selected by the operation of the shift lever 52, the automatic shift control is performed in the shifting mechanism 10 in a step-variable mode within a range of a designated upper limit gear position or the automatic shift control is performed so as to obtain a designated gear position. The "M" position is a shift position for selecting a manual shift mode (manual mode) in a control routine under which the shifting mechanism 10 performs the manual shift control.

FIG. 7 is a functional block diagram illustrating a major part of control functions executed by the electronic control device 80. In FIG. 7, step-variable shift control means 82 executes an operation based on a vehicle condition indicated in terms of a vehicle speed V and demanded output torque TOUT of the automatic shifting portion 20 by referring to the shifting diagrams (relationship and the shifting map) indicated by solid lines and single dot lines in FIG. 8 and preliminarily stored in, for instance, storage means 100. This allows a query to be made as to whether the shifting mechanism 10 needs to execute the shifting. Then, the automatic shifting portion 20 executes the automatic shift control so as to obtain a gear position on a determined result. When this takes place, the step-variable shift control means 82 directly or indirectly outputs commands (shifting output commands or hydraulic pressure command) to the hydraulic control circuit 70 for engaging and/or disengaging the hydraulically operated friction engaging devices such as the switching clutch C0 and the switching brake B0 involved in the shifting. The hydraulic control circuit 70 disengages the hydraulically operated friction engaging devices on a disengaging side, involved in the shifting, in accordance with such commands. In addition, the hydraulic control circuit 70 activates the electromagnetic valves, incorporated therein, to actuate the hydraulic actuators of the hydraulically operated friction engaging devices, involved in the shifting, so as to engage the hydraulically operated friction engaging devices on an engaging side, involved in the shifting, such that the automatic shifting portion 20 executes the shifting.

Hybrid control means 84 functions as continuously-variable shift control means when a continuously-variable shift mode is selected in a control routine to allow the shifting mechanism 10 to perform the shift control in the differential state of the differential portion 11. This allows the engine 8 to operate in an operating range with high efficiency under the continuously variable shifting state of the shifting mechanism 10, i.e., the differential state of the differential portion 11. Moreover, the hybrid control means 84 allows the drive forces of the engine 8 and the second electric motor M2 to vary in an optimum distribution ratio, while varying a reactive force of the first electric motor M1, resulting from the operation to generate electric power, at an optimum rate. This allows the differential portion 11 to function as an electrically controlled continuously variable transmission with the speed ratio γ0 being controlled in a continuously variable mode, thereby controlling the total speed ratio γT in a continuously variable fashion.

The hybrid control means 84 calculates a target (demanded) output of a vehicle by referring to, for instance, the accel-opening θACC, representing a driver's output demand value, and the vehicle speed V of the vehicle running at a given time, while calculating a demanded target total vehicle output based on the target output of the vehicle and a state of charge demand value. The hybrid control means 84 further calculates a target engine output in view of a loss in power transfer, auxiliary unit loads and assist torque of the second electric motor M2, etc., so as to obtain the total target output. The hybrid control means 84 controls the total speed ratio γT and the output of the engine 8 while controlling a rate of electric power generated by the first electric motor M1 so as to achieve the engine rotation speed NE and engine torque TE such that the target engine output is obtained.

The hybrid control means 84 executes such controls upon taking the gear position of the automatic shifting portion 20 into consideration during the continuously variable shift control with a view to performing the control for improved drive power performance and fuel consumption. With such a hybrid control, the differential portion 11 is caused to function as the electrically controlled continuously variable transmission to allow the engine rotation speed NE, determined for the engine 8 to operate in the operating range with increased efficiency, to match the rotation speed of the power transfer member 18 determined by the vehicle speed V and the gear position of the automatic shifting portion 20. That is, the hybrid control means 84 determines a target value of the total speed ratio γT of the shifting mechanism 10. This allows the engine 8 to operate in accordance with an optimum fuel economy curve (fuel-economy map and relationship) preliminarily obtained on experimental tests to have a compromise between driveability and fuel consumption during the running of the vehicle under the continuously variable shifting on the two-dimensional coordinate system defined by the engine rotation speed NE and engine torque TE.

That is, the operation of the engine 8, executed in line with the optimum fuel economy curve, represents engine torque TE and the engine rotation speed NE for a demanded engine output to be produced for satisfying, for instance, a target output (total target output and a demanded drive force). To this end, the speed ratio γ0 of the differential portion 11 is controlled in view of the gear position of the automatic shifting portion 20 so as to obtain such a target value, while controlling the total speed ratio γT within a shiftable varying range such as, for example, a range from 13 to 0.5.

During such a control, the hybrid control means 84 allows electric energy, generated by the first electric motor M1, to be supplied to the battery 56 and the second electric motor M2 through the inverter 54 and, hence, a major part of the drive power of the engine 8 is mechanically transferred to the power transfer member 18. However, the remaining part of the drive power of the engine 8 is consumed with the first electric motor M1 for conversion to electric energy, which is supplied through the inverter 54 to the second electric motor M2. This allows the second electric motor M2 to be driven to transfer mechanical energy to the power transfer member 18. Thus, equipment, involved in generating electric energy and causing the second electric motor M2 to consume electric energy, establishes an electric path in which the part of the drive power of the engine 8 is converted into electric energy which in turn is converted to mechanical energy.

Further, the hybrid control means 84 functionally includes engine output control means operative to execute the output control of the engine 8 so as to allow the engine 8 to provide the demanded output. That is, the hybrid control means 84 causes the throttle actuator 64 to controllably open or close the electronic throttle valve 62 for performing the throttle control. Aside from such a control, the hybrid control means 84 outputs commands independently or in combination to the engine output control device 58 for causing the fuel injection device 66 to control a fuel injection quantity and an injection timing while causing the ignition device 68 to control an ignition timing for performing the ignition timing control. The engine output control device 58 allows the throttle actuator 64 to controllably open or close the electronic throttle valve 62 for performing the throttle control in accordance with the commands delivered from the hybrid control means 84. In addition, the engine output control device 58 causes the fuel injection device 66 to control the fuel injection for performing the fuel injection control while causing the ignition device 68 such as the igniter to control the ignition timing for performing the ignition timing control, thereby permitting the engine 8 to provide the demanded engine output.

Figure 8:
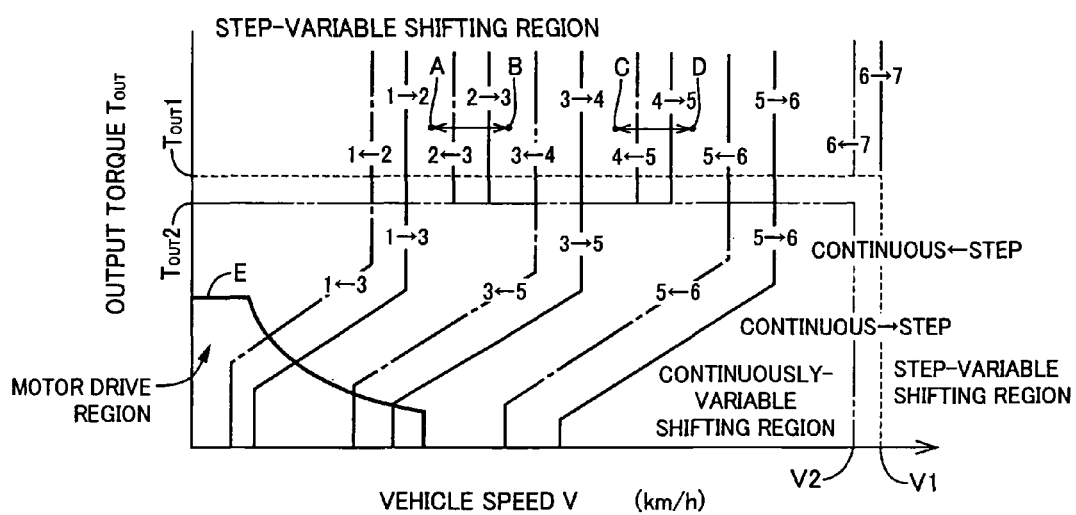
FIG. 8 is a view illustrating an example of a stored shifting boundary line map used for determining a shifting action of an automatic transmission portion, an example of a stored shifting-state switching boundary line map used for switching the shifting state of the transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

Further, the hybrid control means 84 allows the differential portion 11 to perform an electrically controlled CVT function (differential function), regardless of the engine 8 placed in a halted state or an idling condition, for enabling the vehicle to run under a motor-drive mode. A solid line E, shown in FIG. 8, represents a boundary line between an engine-drive running region and a motor-drive running region for the engine 8 and the electric motor, i.e., for instance, the second electric motor M2 to be switched as a drive-force source for startup and/or running (hereinafter referred to as "running") of the vehicle. In other words, this solid line represents the boundary line for enabling the switching between a so-called engine-drive mode, for the engine 8 to act as the drive force source for startup and/or running (hereinafter referred to as "running") of the vehicle, and a so-called motor-drive mode for the second electric motor M2 to act as the drive force source for the running of the vehicle. The relationship, indicated on the boundary line (solid line E) shown in FIG. 8, represents one example of a drive-force source switching diagram (drive-force source map) plotted on a two-dimensional coordinate system taking parameters in terms of the vehicle speed V and demanded output torque TOUT representing a drive-force correlated value. This drive-force source switching diagram is preliminarily stored in the storage means 100 together with the shifting diagram (shifting map) indicated by, for instance, the solid lines and the single dot lines shown in FIG. 8.

The hybrid control means 84 executes the operation based on the vehicle condition indicated in terms of the vehicle speed V and demanded output torque $T_{OUT}$ by referring to, for instance, the drive-force source switching diagram shown in FIG. 8 to determine which of the motor-drive running region or the engine-drive running region is to be switched, thereby executing the motor-drive mode or the engine-drive mode. As will be apparent from FIG. 8, the hybrid control means 84 executes the motor-drive mode in a relatively low demanded output torque-TOUT range, i.e., a relatively low engine torque-TE range or a relatively low vehicle speed area of the vehicle speed V, i.e., a relatively low load region, which is generally regarded to be relatively lower in engine efficiency than that of a high torque range. In usual practice, a motor-drive startup is initiated prior to the initiating of an engine-drive startup. Under a vehicle condition in which the accelerator pedal is deeply depressed with demanded output toque TOUT, i.e., demanded engine torque TE exceeding the motor-drive running region in the drive-force source switching diagram shown in FIG. 8 during, for instance, a startup of the vehicle, an engine-drive startup is usually initiated.

With a view to suppressing drag of the engine 8 remained under a halted state to improve fuel consumption, the hybrid control means 84 allows, for instance, the first electric motor M1 to be placed in an unloaded condition for freewheeling during the motor-drive running mode. This enables the differential portion 11 to perform the electrically controlled CVT function (differential function) such that the engine rotation speed NE is maintained at zeroed or nearly zeroed level depending on need.

Even under the engine-drive running region, the hybrid control means 84 allows electric energy, generated by the first electric motor M1 in the electric path mentioned above, and electric energy discharged from the battery 56 to be supplied to the second electric motor M2 to drive the same to provide output torque. This makes it possible to apply additional output torque to the drive wheels 32 to perform a so-called "torque assist" to assist the drive power of the engine 8. Thus, the engine-drive mode of the present invention may involve a combination of the engine drive mode and the motor-drive mode.

The hybrid control means 84 allows the differential portion 11 to perform the electrically controlled CVT function to control, for instance, the first-motor rotation speed NM1 regardless of the vehicle remaining under a halted state or a running state. This enables the engine rotation speed NE to be kept nearly constant or the engine rotation speed NE to be controlled at an arbitrary rotation speed. Stated another way, the hybrid control means 84 enables the engine rotation speed NE to be nearly constant or the engine rotation speed NE to be controlled at the arbitrary rotation speed while rotatably controlling the first-motor rotation speed NM1 at an arbitrary rotation speed. As will be apparent from the collinear chart shown in FIG. 3, the hybrid control means 84 executes the operation to raise the engine rotation speed NE during the running of the vehicle. In this case, the hybrid control means 84 executes the operation to raise the first-motor rotation speed NM1 while causing the second-motor rotation speed NM2, bound with the vehicle speed V (rotation speeds of the drive wheels 32), to be kept nearly constant.

The switching control means 86 switches the engaging/disengaging states of the switching engaging devices (switching clutch C0 or the switching brake B0) based on the vehicle condition. This allows a shifting state to be selectively switched between the continuously variable shifting state, i.e., the differential state, and the step-variable shifting state, i.e., the locked state. For example, the switching control means 86 executes the operation based on the vehicle condition, represented in terms of demanded output torque TOUT and the vehicle speed V to determine as to whether the shifting mechanism 10 belongs to a continuously-variable region, for the shifting mechanism 10 to be placed in the continuously variable shifting state, or a step-variable region for the shifting mechanism 10 to be placed in the step-variable shifting state as preliminarily stored in the storage means 100 and shown in FIG. 8. Then, the engagement of the switching clutch C0 or the switching brake B0 and the disengagements of the switching clutch C0 and the switching brake B0 are switched, thereby selectively switching the shifting mechanism 10 to be placed in any one of the continuously variable shifting state and the step-variable shifting state.

That is, when the switching control means 86 determines that the vehicle condition lies in a step-variable shift control region, the switching control means 86 outputs a signal to the hybrid control means 84 for disabling or canceling the hybrid control or the continuously-variable shifting control. At the same time, the switching control means 86 permits the step-variable shift control means 82 to perform a predetermined shift for the step-variable shifting, while causing the switching clutch C0 or the switching brake B0 to engage in accordance with a determination on the shifting executed by the step-variable shift control means 82. When this takes place, the step-variable shift control means 82 allows the automatic shifting portion 20 to execute the automatic shift control for establishing the forward-drive 7th-speed in accordance with the shifting diagram preliminarily stored in the storage means 100 and indicated in, for instance, FIG. 8. The table of FIG. 2, preliminarily stored in the storage means 100, indicates combinations in operations of the hydraulically operated friction engaging devices C0, C1, C2, C3, B0, B1 and B2 to be selected in the shifting executed at that time. That is, a whole of the shifting mechanism 10, i.e., the differential portion and the automatic shifting portion 20, functions as a so-called step-variable automatic shifting portion in which the gear position is established in accordance with the engagement operation table shown in FIG. 2.

Meanwhile, the switching control means 86 outputs commands to the hydraulic control circuit 70 for disengaging the switching clutch C0 and the switching brake B0. This is because upon a determination of the vehicle condition, represented in terms of demanded output torque TOUT and the vehicle speed V, remained in the continuously variable region shown in FIG. 8, the differential portion 11 is placed in the continuously variable shifting state to enable the continuously variable shifting to allow the shifting mechanism 10 as a whole to obtain the continuously variable shifting state. At the same time, the switching control means 86 outputs a signal to the hybrid control means 84 for permitting the hybrid control to be executed. In addition, the switching control means 86 outputs a signal to the step-variable shift control means 82 for the continuously variable shifting to be fixed in a predetermined gear position or a signal for permitting the automatic shifting to be executed in the automatic shifting portion 20 in accordance with the shifting diagram preliminarily stored in the storage means 100 and shown in FIG. 8.

In such a case, the step-variable shift control means 82 allows the automatic shifting portion 20 to perform the automatic shifting for the forward-drive 4th-speed gear position except the engagements of the switching clutch C0 and the switching brake B0 in the engagement operation table shown in FIG. 2. That is, the automatic shifting is performed in: a first gear position (speed ratio $\gamma A=3.683$) that is accomplished upon engaging the first clutch C1 and the second brake B2; a second gear position (speed ratio $\gamma A=1.909$) that is accomplished upon engaging the first clutch C1 and the first brake B1; a third gear position (speed ratio $\gamma A=1.000$) that is accomplished upon engaging the first and third clutches C1 and C3; and a fourth gear position (speed ratio $\gamma A=0.661$) that is accomplished upon engaging the third clutch C3 and the first brake B1. Thus, the differential portion 11 is switched to the continuously variable shifting state by the switching control means 86 to function as the continuously variable transmission, and the automatic shifting portion 20, connected to the differential portion 11 in series, functions as the step-variable transmission.

With such functions, a drive force can be obtained at an appropriate magnitude while, at the same time, the rotation speed input to the automatic shifting portion 20, i.e., the rotation speed N18 of the power transfer member 18, is caused to vary in a continuously variable mode for each of the 1st-speed to the 4th-speed gear positions achieved in the automatic shifting portion 20. This enables each gear position to have a continuously variable speed ratio width. Consequently, a speed ratio between adjacent gear positions can be continuously variable in a stepless mode such that the shifting mechanism 10 as a whole can be placed in the continuously variable shifting state to obtain the total speed ratio $\gamma T$ in a continuously variable mode.

FIG. 8 represents the shifting diagram (relationship and shifting map) preliminarily stored in the storage means 100 based on which the automatic shifting portion 20 executes the shift determination to show an example of the shifting diagram plotted on the two-dimensional coordinate system with parameters including the vehicle speed V and demanded output torque TOUT indicative of a drive-force related value. Solid lines in FIG. 8 represent upshift lines and single dot lines represent downshift lines. A broken line in FIG. 8 represents a determining vehicle speed limit V1 and determining output torque TOUT 1 to be used for determining whether the continuously variable control region and the step-variable control region are to be switched. That is, the broken line in FIG. 8 represents a high vehicle-speed drive determining line, contiguous with the determining vehicle speed V1 and representing a predetermined high-speed drive determining value for determining if the hybrid vehicle belongs to a high-speed drive region, and a high-output drive determining line. The high-output drive determining line is contiguous with determining output torque TOUT 1 and represents a predetermined high-output drive determining value for determining the drive-force related value, relevant to the demanded drive force of the hybrid vehicle, i.e., for instance, a high-output drive region and a high-torque drive region in which the automatic shifting portion 20 provides output torque TOUT in a high output.

Further, as shown by a double dot line in FIG. 8, a hysteresis is provided relative to the broken line in FIG. 8 for making a determination between the step-variable control region and the continuously variable control region. That is, FIG. 8 represents a preliminarily stored switching diagram (switching map and relationship) for the switching control means 86 to make a determination on which of the step-variable control region or the continuously variable control region is to be switched. This determination is made based on parameters including the vehicle speed V and demanded output torque TOUT and involving determining vehicle speeds V1 and V2 and determining output torques TOUT 1 and TOUT 2. Such a switching diagram may be included as a shifting map and preliminarily stored in the storage means 100. Moreover, the switching diagram may be of the type that includes at least one of the determining vehicle speed V1 and determining output torque TOUT 1 or a preliminarily stored switching line defined in terms of any one of the vehicle speed V and demanded output torque TOUT as a parameter.

The shifting diagram, the switching diagram and the drive-force source switching diagram may not be stored in the maps but may be stored in a determining formula, in which an actual vehicle speed V and the determining vehicle speeds V1 and V2 are compared to each other, or another determining formula in which demanded output torque TOUT and determining output torques TOUT 1 and TOUT 2 are compared to each other. In this case, the switching control means 86 makes a query as to whether the actual vehicle speed V exceeds the determining vehicle speed V1 and, if the actual vehicle speed V exceeds the determining vehicle speed V1, the switching control means 86 allows the switching clutch C0 or the switching brake B0 to engage such that the shifting mechanism 10 is placed in the step-variable shifting state. Further, the switching control means 86 makes a query as to whether demanded output torque TOUT of the automatic shifting portion 20 exceeds determining output torque TOUT 1 and, if demanded output torque TOUT of the automatic shifting portion 20 exceeds determining output torque TOUT 1, the switching control means 86 allows the switching clutch C0 or the switching brake B0 to engage such that the shifting mechanism 10 is placed in the step-variable shifting state.

While demanded output torque TOUT is plotted on the longitudinal axis of FIG. 8, it may suffice for such a parameter to include a demanded drive-force correlated value. As used herein, the term "demanded drive-force correlated value" refers to a parameter corresponding to a demanded drive force of the vehicle in one-to-one relation. Examples of such a parameter not only include demanded drive torque for the drive wheels 32 or the drive force but also demanded values. These demanded values include demanded output torque TOUT for the automatic shifting portion 20, demanded engine torque TE and demanded vehicle acceleration G, i.e., for instance, engine torque TE calculated based on the accel-opening θACC or the throttle-valve opening (or an intake air quantity, an air/fuel ratio or a fuel injection quantity) and the engine rotation speed NE, etc. In addition, drive torque may be calculated in view of a differential ratio or radii of the drive wheels 32 by referring to output torque TOUT or the like or may be directly detected using a torque sensor or the like. This similarly applies to other torques mentioned above.

If the shifting mechanism 10 is placed in the continuously variable shifting state during, for instance, the running of the vehicle at a high speed, deterioration occurs in fuel consumption. To address such an issue, the determining vehicle speed V1 is determined such that the shifting mechanism 10 is placed in the step-variable shifting state for the running of the vehicle at the high speed. Further, determining torque TOUT 1 is determined depending on the characteristic of the first electric motor M1 made available to be disposed with a reduction in maximum output of electric energy to be generated. This is because the first electric motor M1 is miniaturized in size with no reactive torque arranged to counteract the output of the engine 8 in a range up to a high output region thereof during the running of the vehicle at a high output.

As indicated on the relationship shown in FIG. 8, a step-variable control region is determined to belong to an area covering a high torque region, in which output torque TOUT exceeds the predetermined determining output torque TOUT 1, or a high vehicle speed region in which the vehicle speed V exceeds the predetermined determining vehicle speed V1. Accordingly, a step-variable shift drive mode is executed for high drive torque, wherein the engine 8 provides relatively high torque, or a relatively high vehicle-speed region of the vehicle speed V. A continuously variable shift drive mode is executed for low drive torque, in which the engine 8 provides relatively low torque, or a relatively low vehicle speed region of the vehicle speed, i.e., when the engine 8 is operating in a normal output region.

With such executions, during the running of the vehicle at a low and medium speed and a low and medium output, the shifting mechanism 10 is placed in the continuously variable shifting state to ensure fuel economy performance of the vehicle. In addition, the automatic shifting portion 20 is caused to operate in the four-stage gear positions, the maximum value of electric energy to be generated by the first electric motor M1, i.e., electric energy to be transferred through the first electric motor M1, can be minimized, achieving a further miniaturization of the first electric motor M1 or a vehicular drive apparatus including such a component part.

During the running of the vehicle at a high speed in which the vehicle speed V exceeds the determining vehicle speed V1 or a high output in which output torque TOUT exceeds determining output torque TOUT 1, the shifting mechanism 10 is placed in the step-variable shifting state to operate as a step-variable transmission. This allows the output of the engine 8 to be transferred to the drive wheels 32 mainly through the mechanical power transfer path. This minimizes a loss in conversion between the drive power and electric energy occurring when the shifting mechanism 10 is caused to operate as the electrically controlled continuously variable transmission, thereby improving fuel consumption.

Meanwhile, the shifting mechanism 10 of the present embodiment is arranged to execute the shifting in the forward-drive seven gear positions during the step-variable shifting condition with a view to having a close ratio and a wide speed-ratio range as shown in FIG. 2. This is accomplished by combining the operation of the automatic shifting portion 20 arranged to execute the shifting in the four gear positions, and the operation of the differential gear 11 arranged to execute the shifting in the two gear positions. As set forth above, accordingly, the shifting in the differential portion 11 and the shifting in the automatic shifting portion 20 are concurrently executed within the same shifting period to switch the 2nd-speed gear position to the 3rd-speed gear position and the 4th-speed gear position to the 5th-speed gear position. As shown in FIG. 8, a shift occurs between the 2nd-speed gear position and the 3rd-speed gear position, caused by a variation in vehicle condition between a point "A" and a point B, and another shift occurs between the 4th-speed gear position and the 5th-speed gear position caused by a variation in vehicle condition between a point C and a point D. During such shifting, a downshift in one of the differential portion 11 and the automatic shifting portion 20 and an upshift in the other one of the differential portion 11 and the automatic shifting portion 20 are executed around the same time. With the present embodiment, the shifting executed around the same time for the downshift in one of the differential portion 11 and the automatic shifting portion 20 and the upshift in the other one of the differential portion 11 and the automatic shifting portion 20 will be defined as "concurrent shifting".

During the concurrent shifting set forth above, executing the downshift in one of the differential portion 11 and the automatic shifting portion 20 results in an increase in the engine rotation speed NE, and, at the same time, executing the upshift in the other one of the differential portion 11 and the automatic shifting portion 20 results in a decrease in the engine rotation speed NE. Thus, the engine rotation speed NE is caused to vary on opposite directions. Depending on the timing at which the shifting are executed in the differential portion 11 and the automatic shifting portion 20, i.e., a shifting progress state or shifting progress state, in other words, a slight degree of a deviation in such timing, the engine rotation speed NE fluctuates with a risk of uncomfortable feeling occurring on a vehicle occupant as a gearshift shock i.e., shifting shock.

When attempting to allow the shifting mechanism 10 as a whole to perform the upshifting, the engine rotation speed NE is caused to decrease. Depending on the timing at which the downshift in one of the differential portion 11 and the automatic shifting portion 20 and the upshift in the other one of the differential portion 11 and the automatic shifting portion 20, it is likely that the shifting progress state in the shifting mechanism 10 as a whole is caused to temporarily shift toward a downshift side with a resultant increase in the engine rotation speed NE. This results in likelihood of a fluctuation occurring in the engine rotation speed NE during the shifting with a resultant increase in gearshift shock. Although the present embodiment has been described above with reference to an exemplary case where the upshift is executed by the shifting mechanism 10 as a whole, it is of course to be appreciated that the downshift has the same problem as that described above, merely except for each shifting direction and the engine rotation speed NE varying in the opposite directions.

In view of the above, in the present embodiment, during the concurrent shifting, the first electric motor M1 is arranged to control the rotation speed of the second rotary element RE2 (sun gear S0) to control the shifting progress state occurring in the concurrent shifting. For instance, controlling the rotation speed of the first electric motor M1 allows the shifting progress state in one of the differential portion 11 and the automatic shifting portion 20 to be controlled relative to the shifting progress state in the other one of the differential portion 11 and the automatic shifting portion 20. In this moment, the first electric motor M1 may be controlled so as to begin and complete the step-variable shifting of the differential portion 11 within an inertia phase period in which the automatic shifting portion 20 performs the step-variable shifting.

More particularly, the step-variable shift control means 82 (see FIG. 7) includes concurrent shifting determining means 88, second shift control means 90, inertia-phase determining means 92 and first shift control means 94. Among these, the concurrent shifting determining means 88 determines if the concurrent shifting is determined based on the vehicle condition represented in terms of the vehicle speed V and demanded output torque TOUT by referring to for instance the relationship shown in FIG. 8. When the concurrent shifting determining means 88 determines the presence of the concurrent shifting, the second shift control means 90 allows the automatic shifting portion 20 to perform the clutch-to-clutch shifting in advance for accomplishing the concurrent shifting. The inertia-phase determining means 92 executes an operation based on variation in the engine rotation speed NE or variation in the rotation speed N18 of the power transfer member 18 to determine the beginning of the inertia phase during the clutch-to-clutch shifting of the automatic shifting portion 20.

When the inertia-phase determining means 92 determines presence of the inertia phase, the first shift control means 94 allows the switching control means 86 to directly or indirectly command the hydraulic control circuit 70 to begin and complete the clutch-to-clutch shifting in the differential portion 11. This allows the concurrent shifting to be accomplished within the inertia phase interval, i.e., a variation interval of the engine rotation speed NE. The step-variable shift control means 82 executes a so-called "concealed control" in which the differential portion 11 begins and completes the clutch-to-clutch shifting during the clutch-to-clutch shifting of the automatic shifting portion 20. To this end, the step-variable shift control means 82 controls timings at which the second shift control means 90 executes the clutch-to-clutch shifting and the first shift control means 94 executes the clutch-to-clutch shifting, and the engaging pressures of the friction engaging devices are controlled.

First-motor rotation-speed control means 96 allows the first electric motor M1 to control the rotation speed of the sun gear S0, in parallel to an increases in the engaging pressure of the friction engaging devices during the operation of the first shift control means 94. This allows the differential portion 11 to execute the clutch-to-clutch shifting to control the shifting progress state during the concurrent shifting, thereby suppressing the occurrence of gearshift shock arising from the concurrent shifting. The first-motor rotation-speed control means 96 controls the first electric motor M1 toward the rotation speed of the sun gear S0 on a stage subsequent to the clutch-to-clutch shifting initiated in the differential portion 11 such that the concealed control can be appropriately performed.

During such operation, the first-motor rotation-speed control means 96 controls the first electric motor M1 depending on (in synchronism with) variation in the input rotation speed (the rotation speed N18 of the power transfer member 18) of the automatic shifting portion 20 during the concurrent shifting. For instance, the first-motor rotation-speed control means 96 allows the hybrid control means 84 to control the first-motor rotation speed NM1 so as to cause the engine rotation speed NE to vary in the same direction during the concurrent shifting.

That is, during the inertia phase, such a control is executed such that the engine rotation speed NE is caused to vary in the same direction as that in which the engine rotation speed NE varies in conjunction with the clutch-to-clutch shifting of the automatic shifting portion 20. Briefly, in nature, an opposing relationship is present during the concurrent shifting between a direction, in which the engine rotation speed NE varies in conjunction with the clutch-to-clutch shifting of the automatic shifting portion 20, and a direction in which the engine rotation speed NE varies in conjunction with the clutch-to-clutch shifting of the automatic shifting portion 20. Thus, the first-motor rotation speed NM1, i.e., the rotation speed of the sun gear S0, is controlled such that no engine rotation speed NE varies in an original varying direction caused by the clutch-to-clutch shifting of the differential portion 11.

More particularly, the first-motor rotation-speed control means 96 controls the shifting progress state during the concurrent shifting by performing a feedback control of the first-motor rotation speed NM1 such that the engine rotation speed NE varies at a target varying speed toward a rotation speed (=(the total speed ratio γT of the shifting mechanism 10 after the concurrent shifting)×(output-shaft rotation speed NOUT)) subsequent to the concurrent shifting. As used herein, the term "target varying speed" refers to a target value (given varying speed), preliminarily obtained on experimental tests, which is determined for each concurrent shifting to cause the engine rotation speed NE to vary in a certain direction (i.e., in a varying direction in conjunction with the clutch-to-clutch shifting of the automatic shifting portion 20) during the inertia phase depending on the variation in input revolutions i.e., numbers of input rotation of the automatic shifting portion 20 so as to suppress the occurrence of gearshift shock.

Engine output decreasing means 98 causes the hybrid control means 84 to render the engine output control device 58 operative to temporarily decrease the output of the engine 8, preferably in the same period as the inertia phase, when the inertia-phase determining means 92 determines presence of the inertia phase. This allows a further reduction in gearshift shock caused by the concurrent shifting.

Figure 9:
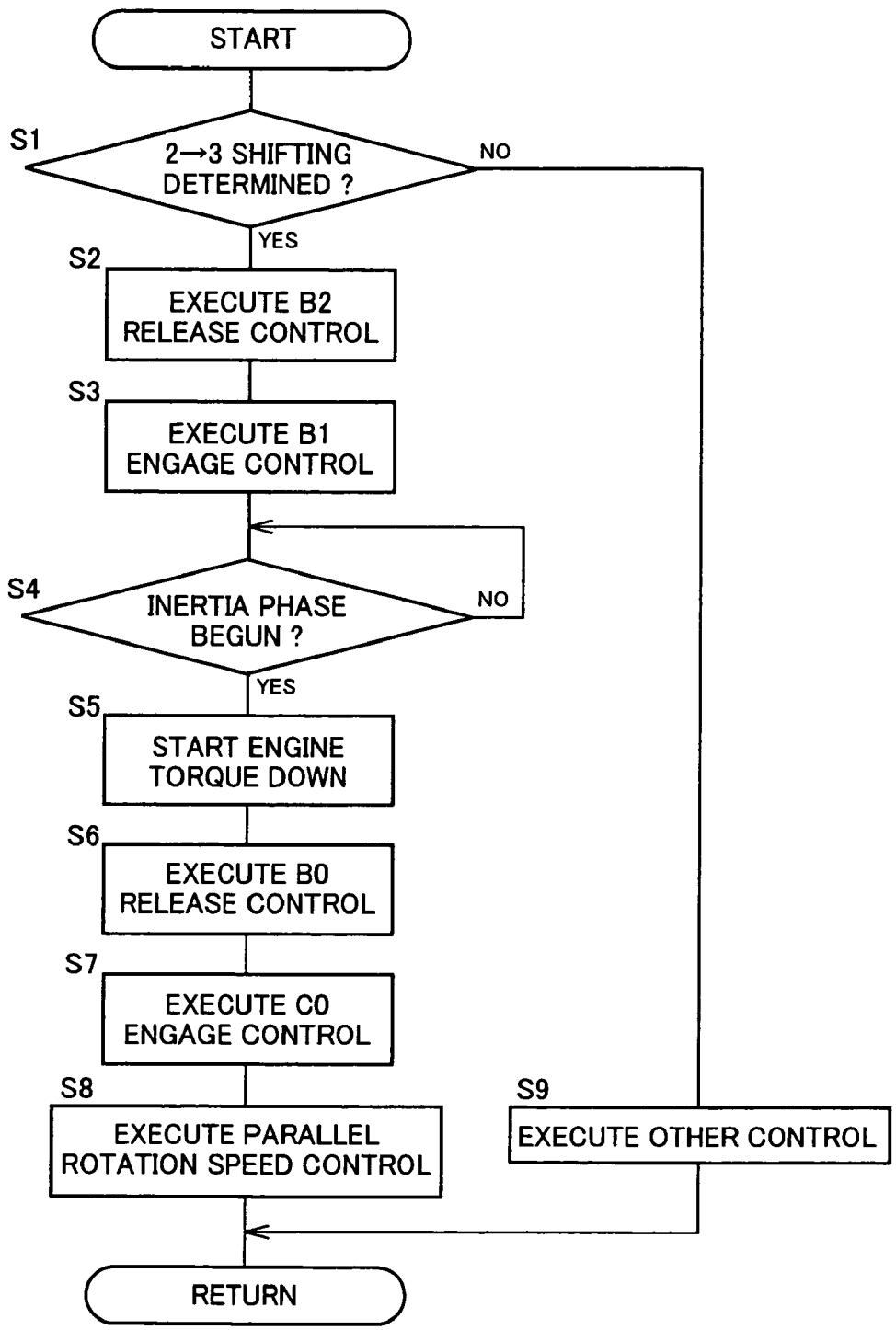
FIG. 9 is a flow chart illustrating a major part of control operations executed by the electronic control device shown in FIG. 4, i.e., a shift control operation for controlling concurrent shifting on a step-variable shifting state.
Figure 10:
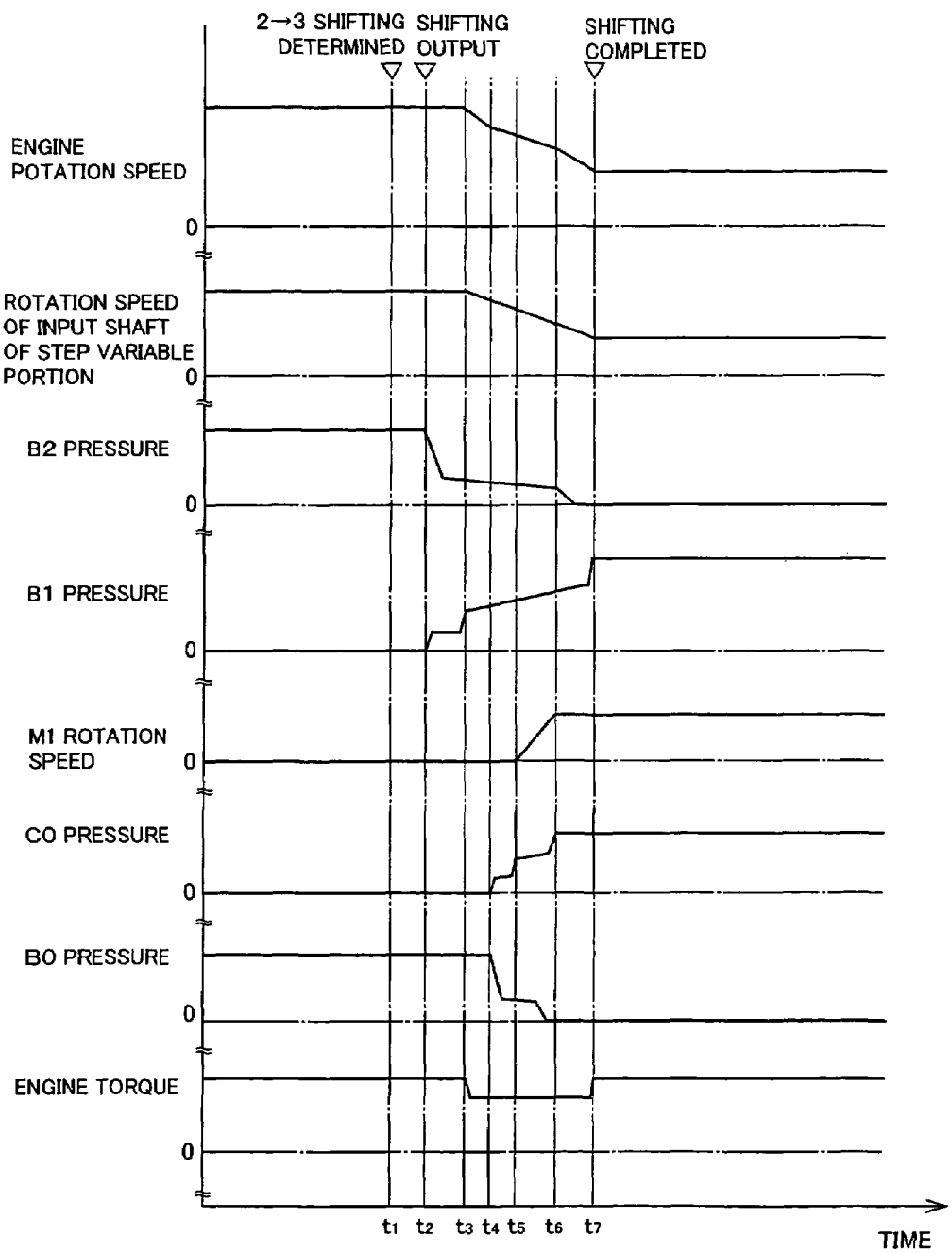
FIG. 10 is a timing chart illustrating the control operations shown in FIG. 8 and representing an exemplary case in which a "2→3 upshift occurs in a shifting mechanism.

FIG. 9 is a flow chart illustrating a major part of control operations to be executed by the electronic control device 80, i.e., shift control operations for controlling the concurrent shifting for the step-variable shifting state, which are repeatedly executed for a given cycle. FIG. 10 is a timing chart, illustrating the control operations shown in FIG. 9, which represents one exemplary case in which a "2→3 upshift" occurs in the shifting mechanism 10.

In FIG. 9, first at step (hereinafter the term "step" will be omitted) S1 corresponding to the concurrent shifting determining means 88, a query is made as to whether the concurrent shifting occurs. That is, a query is made as to whether with depressing the accelerator pedal to increase the vehicle speed V for varying the vehicle condition as indicated by a transition between the points A→B in FIG. 8, a determination on the shifting from the 2nd-speed gear position to the 3rd-speed gear position is made during the running of the vehicle under the step-variable shifting state, or a query is made as to whether the 2nd-speed gear position is switched to the 3rd-speed gear position.

If the answer to S1 is no, then at S9, the other control aside from the control related to the concurrent shifting is executed or the current routine is completed.

If the answer to S1 is yes, then at S2 corresponding to the second shift control means 90, the automatic shifting portion 20 executes the clutch-to-clutch shifting prior to the operation of the differential portion 11 to execute the clutch-to-clutch shifting for accomplishing the concurrent shifting. This flow chart will be described with reference to an exemplary case related to the 2→3 upshifting. Therefore, first, a command is output to lower the engaging pressure of the brake B2, which is consequently caused to disengage.

At next S3 corresponding to the second shift control means 90, a command is output for increasing the engaging pressure of the brake B1, which begins to engage.

As the operation at S3 is executed, the input rotation speed of the automatic shifting portion 20 decreases to cause the engine rotation speed NE to begin decreasing, thereby causing the inertia phase to begin. At S4 corresponding to the inertia-phase determining means 92 subsequent to S3, a query is made, based on a drop of the beginning in the engine rotation speed NE due to the brake B1 being engaged, as to whether the inertia phase has begun.

If the answer to S4 is no, then, the operation at S4 is repeatedly executed. In contrast, if the answer to S4 is yes, then at S5 corresponding to the engine output decreasing means 98, the throttle actuator 64 is actuated to close the electronic throttle valve 62, the fuel injection device 66 is actuated to decrease the fuel injection quantity, and the ignition device is activated to retard the ignition timing, etc. This allows the engine 8 to provide an output (, for instance, engine torque) at a temporarily decreasing rate. The temporary reduction in the output of the engine 8 at S5 has no need to be necessarily executed.

At succeeding S6 corresponding to the first shift control means 94, the differential portion 11 is caused to execute the clutch-to-clutch shifting for accomplishing the concurrent shifting. To this end, a command is output for dropping the engaging pressure of the brake B0, which is consequently caused to disengage.

At consecutive S7 corresponding to the first shift control means 94, a command is output for increasing the engaging pressure of the clutch C0, which begins to engage.

At S8 corresponding to the first-motor rotation-speed control means 96 executed in parallel to the operation at S7, the first electric motor M1 is rendered operative to control the rotation speed of the sun gear S0 so as to control the shifting progress state during the concurrent shifting, thereby suppressing the occurrence of gearshift shock caused by the concurrent shifting. At this time, the first electric motor M1 is controlled, depending on variation in revolutions of the power transfer member 18 caused by the clutch-to-clutch shifting of the automatic shifting portion 20, such that the engine rotation speed NE varies in the same direction during the inertia phase with achieving a given varying speed rate. That is, the first electric motor M1 is controlled toward the rotation speed of the sun gear S0 subsequent to the clutch-to-clutch shifting of the differential portion 11 to permit the concealed control to be appropriately executed.

For the 2→3 upshifting, for instance, the first electric motor M1 increases the rotation speed of the sun gear S0 in synchronism with the drop in the rotation speed of the power transfer member 18. For the 2→3 upshifting, in nature, the automatic shifting portion executes the upshifting followed by a drop in the engine rotation speed NE. If the first-motor rotation speed NM1 (rotation speed of the sun gear S0) is caused to increase so as to allow the differential portion 11 to initiate the downshifting, the engine rotation speed NE is caused to vary in a direction to increase. However, if the engine rotation speed NE fluctuates during the concurrent shifting for the 2→3 upshifting, such a fluctuation results in a cause of gearshift shock.

In view of this, the first electric motor M1 is caused to increase the rotation speed of the sun gear S0 toward the rotation speed value subsequent to the clutch-to-clutch shifting of the differential portion 11 such that no engine rotation speed NE increases. Thus, the engine rotation speed NE is caused to vary in the uniform decreasing direction.

At S8, the first electric motor M1 performs a timing control (to control the shifting progress state) in the synchronizing control as mentioned above so as to appropriately perform the concealed control during the concurrent shifting. For the completion of the concurrent shifting, the output reduction (e.g. engine torque down) of the engine 8 commenced at S5 is terminated. With no execution of the concealed control, when the differential portion 11 and the automatic shifting portion 20 executes the shifting in directions opposite to each other around the substantially same time, the first electric motor M1 may suffice to execute the synchronizing control so as to allow the differential portion 11 and the automatic shifting portion 20 to terminate the shifting at the same time.

In FIG. 10, time t1 represents that the 2→3 upshifting is determined during the concurrent shifting. Thus, a command is output to the automatic shifting portion 20 such that the clutch-to-clutch shifting is executed prior to a command being output to the differential portion 11 so as to execute the clutch-to-clutch shifting, for accomplishing the 2→3 upshifting at time t2. That is, first at time t2, a command is output to lower the engaging pressure of the brake B2 and to increase the engaging pressure of the brake B1. As a result, at time t3, the input rotation speed of the automatic shifting portion 20 decreases to cause the engine rotation speed NE to begin decreasing. Thus, the inertia phase began.

With the beginning of the inertia phase, the engine torque temporarily decreases during the inertia phase from, for instance, time t3 to time t7. That is, at time t4, a command is output to decrease the engaging pressure of the switching brake B0 and a command is output to increase the engaging pressure of the switching clutch C0. In order to appropriately perform the concealed control in which the differential portion 11 begins and completes the clutch-to-clutch shifting during the inertia phase, the first electric motor M1 increases the rotation sped of the sun gear S0 in parallel to the operation to increase the engaging pressure of the switching brake B0. Such an operation is executed in synchronism with a drop in the input rotation speed of the automatic shifting portion 20. As represented in a time interval between times t5 and t6, the first-motor rotation speed NM1 is caused to increase toward the rotation speed of the sun gear S0 on a stage subsequent to the switching clutch C0 being caused to engage such that no increase occurs in engine rotation speed NE. The feedback control is executed to control the first-motor rotation speed NM1 such that the engine rotation speed NE varies at a target varying speed toward the rotation speed subsequent to the concurrent shifting. This allows the engine rotation speed NE to vary at a uniform decrement rate, thereby suppressing gearshift shock.

As set forth above, in the electronic control device 80 of the present embodiment, the first electric motor M1 controls the rotation speed of the second rotary element RE2 (sun gear S0), when performing the concurrent shifting in which the downshifting executed by one of the differential portion 11 (first shifting portion) and the automatic shifting portion (second shifting portion) and the upshifting executed by the other of the differential portion 11 and the automatic shifting portion are simultaneously executed. This allows the shifting progress state to be properly controlled for the concurrent shifting, which can allow the shifting mechanism 10 to shift in a fixed direction. During the shifting of the shifting mechanism 10, this causes the engine rotation speed NE to vary in the uniform direction, enabling the suppression of gearshift shock. When performing the concurrent shifting, the first electric motor M1 is operated to control the rotation speed of the second rotary element RE2 (sun gear S0) for controlling one of the states of shifting progresses with respect to the other of the states of shifting progresses during the concurrent shifting. This can execute one of the shifting states in line with the other one of the shifting states, enabling the suppression of the gearshift shock.

With the electronic control device 80 of the present embodiment, further, the rotation speed control of the first electric motor M1 enables one of the states of shifting progresses to be controlled relative to the other one of the states of shifting progresses of the differential portion 11 and the automatic shifting portion 20 for the concurrent shifting, enabling the gearshift shock to be appropriately suppressed.

With the electronic control device 80 of the present embodiment, furthermore, the first electric motor M1 is controlled so as to begin and complete the step-variable shifting of the differential portion 11 during the inertia phase in the shifting of the automatic shifting portion 20. Consequently, the variation in rotations i.e., revolutions caused by the shifting of the differential portion 11 can be concealed within a variation in revolutions caused by the shifting of the automatic shifting portion 20, thereby enabling the gearshift shock to be appropriately suppressed.

With the electronic control device 80 of the present embodiment, moreover, the rotation speed of the first electric motor M1 is controlled depending on the variation in numbers of input rotation of the automatic shifting portion 20, thereby enabling the shifting portion 11 to execute the shifting in a manner suited to a progress of the shifting executed in the automatic shifting portion 20 during the concurrent shifting. That is, with starting the shifting of the automatic shifting portion 20, the input rotation speed of the automatic shifting portion 20 begins to vary. Thus, controlling the rotation speed of the second rotary element RE2 (sun gear S0) depending on the variation in such an input rotation speed enables the shifting portion 11 to execute the shifting in a manner suited to the progress of the shifting executed in the automatic shifting portion 20 during the concurrent shifting.

With the electronic control device 80 of the present embodiment, further, the first electric motor M1 is controlled so as to vary the engine rotation speed NE in the same direction during the concurrent shifting. Thus, no fluctuation occurs in the engine rotation speed during the concurrent shifting, and a vehicle occupant (driver) recognizes the concurrent shifting in the shifting mechanism 10 as the single shifting as a whole, thereby preventing the driver from having uncomfortable feeling.

With the electronic control device 80 of the present embodiment, furthermore, the output torque of the engine 8 is temporarily lowered during the inertia phase in the shifting of the automatic shifting portion 20, causing a drop in the transfer torque during the concurrent shifting with a resultant further suppression of gearshift shock.

With the electronic control device 80 of the present embodiment, moreover, the automatic shifting portion 20 executes the clutch-to-clutch shifting that is accomplished upon disengaging a disengaging-side engaging element and engaging an engaging-side engaging element. This appropriately suppresses the occurrence of gearshift shock under a circumstance where the clutch-to-clutch shifting requiring to initiate the engagement and the disengagement at delicate timing, and liable to cause the gearshift shock, is executed simultaneously with the shifting of the differential portion 11, thereby appropriately suppressing gearshift shock.

With the shifting mechanism 10 of the present embodiment, the differential portion 11 and the automatic shifting portion 20 are disposed in the power transfer path between the engine 8 and the drive wheels 32. The differential portion 11, including the power distributing mechanism 16 acting as the differential mechanism to distribute the output of the engine 8 to the first electric motor M1 and the automatic shifting portion 20, control the first electric motor M1 such that the engine rotation speed NE is caused to vary in the same direction during the concurrent shifting. This results in an easy control of the engine rotation speed NE with no fluctuation thereof during the concurrent shifting. That is, there is an advantage in which utilizing the differential action of the differential mechanism can easily control the engine rotation speed NE in the same direction by the first electric motor M1.

Next, another embodiment of the present invention will be described below. In the following description, component parts common to those of the embodiment described above will bear like or corresponding reference numerals to omit redundant description.

Second Embodiment

Figure 11:
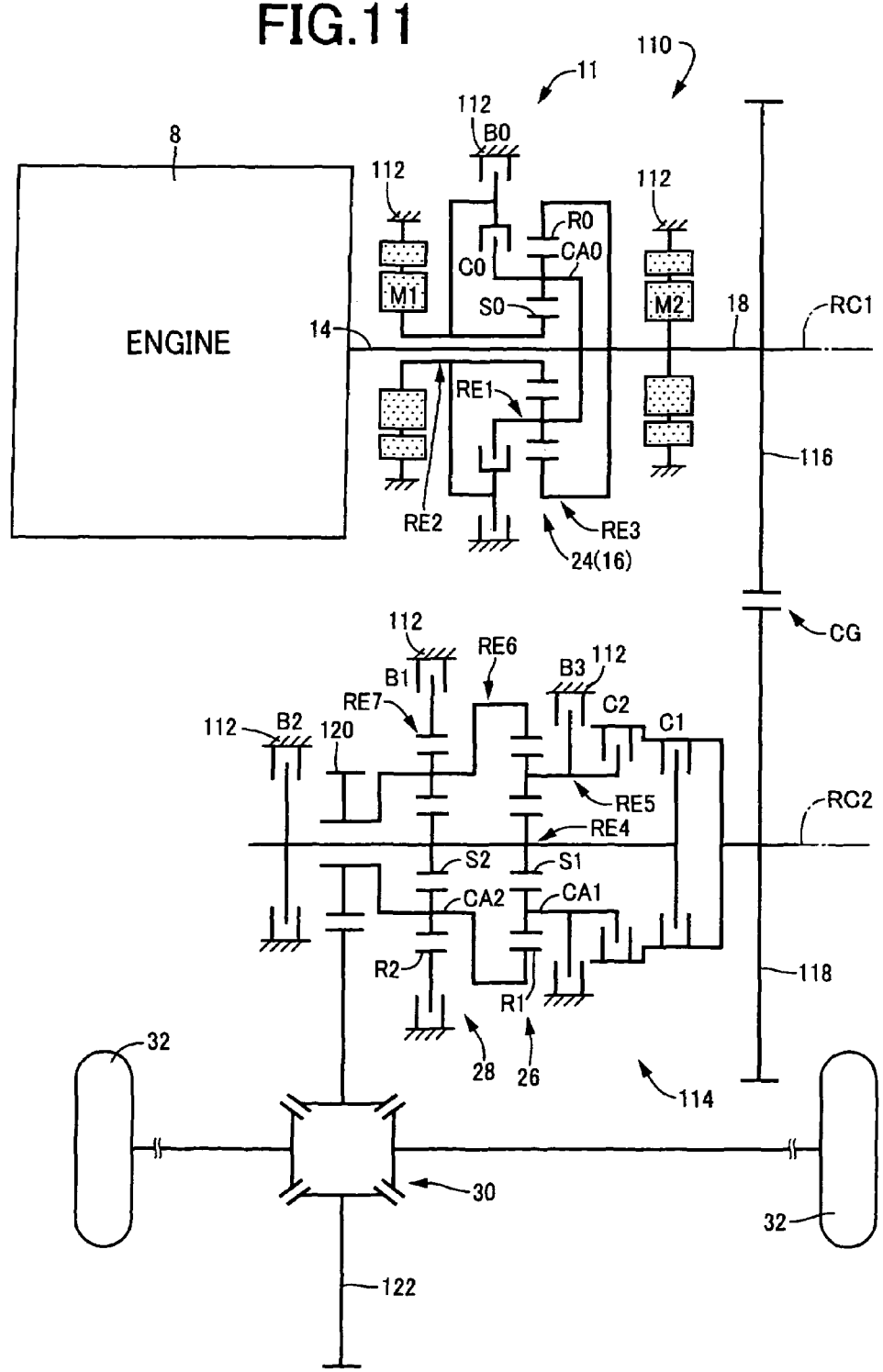
FIG. 11 is a skeleton view illustrating a structure of a shifting mechanism of a hybrid vehicle of another embodiment according to the present invention, corresponding to FIG. 1.
Figures 12, 13:
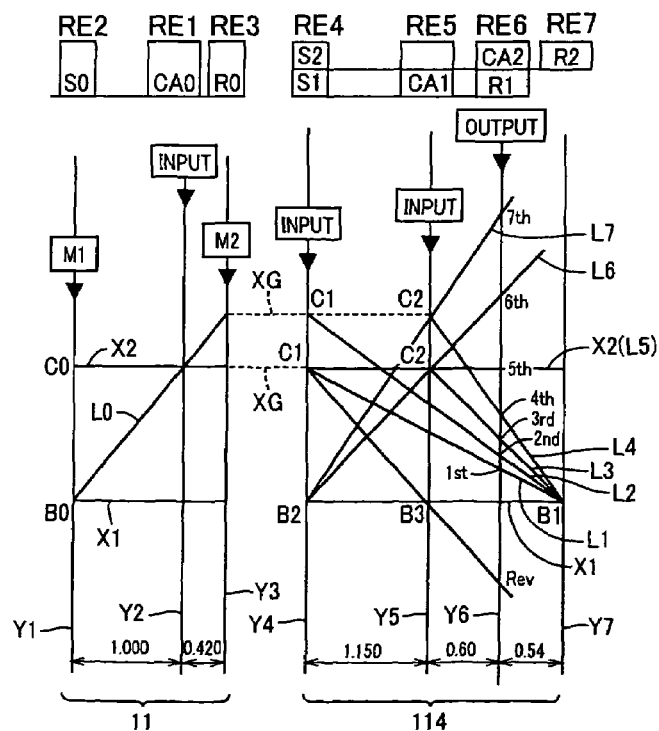
FIG. 12 is an operation diagram illustrating the relationship in combination between gear positions in a step-variable shifting state of the shifting mechanism shown in FIG. 11, and operations of hydraulically operated friction engaging devices for accomplishing such gear positions, corresponding to FIG. 2.
FIG. 13 is a collinear chart illustrating relative rotation speeds related to the respective gear positions under a situation where the shifting mechanism of the hybrid vehicle of the embodiment shown in FIG. 11 is caused to perform a step-variable shifting, corresponding to FIG. 3.

FIG. 11 is a skeleton view illustrating a structure of a shifting mechanism 110 of another embodiment according to the present invention. FIG. 12 is an engagement operation table representing the relationship between gear positions of a shifting mechanism 110 and a combination of engagements of hydraulically operated friction engaging devices. FIG. 13 is a collinear chart illustrating a shifting operation of the shifting mechanism 110.

Like the structure of the first embodiment, the shifting mechanism 110 includes the differential portion 11, composed of the first electric motor M1, the power distributing mechanism 16 and the second electric motor M2 disposed on a first axis RC1, and an automatic shifting portion 114 of forward-drive four gear positions disposed on a second axis RC2 extending parallel to the first axis RC1. This is because of shortening an axial dimension in view of accommodating the shifting mechanism 110 in a trans-axle case (hereinafter referred to as a "case") preferably installed on an FF (Front-Engine and Front-Drive) type vehicle.

The power distributing mechanism 16 includes the planetary gear set 24 of the single pinion type, having a given gear ratio $\rho 0$ of approximately, for instance, "0.300", and the switching clutch C0 and the switching brake B0.

The automatic shifting portion 114 includes the first planetary gear set 26 of the single pinion type, having a given gear ratio $\rho 1$ of approximately, for instance, "0.522", and the second planetary gear set 28 of the single pinion type having a given gear ratio $\rho 2$ of approximately, for instance, "0.309". The first sun gear S1 of the first planetary gear set 26 and the second sun gear S2 of the second planetary gear set 28 are unitarily connected to each other and selectively connected to the power transfer member 18 via the first clutch C1 and a pair of a counter drive gear 116 and a counter driven gear 118

(hereinafter referred to as a "counter gear pair CG") while selectively connected to the case 112 via the second brake B2.

The first carrier CA1 of the first planetary gear set 26 is selectively connected to the power transfer member 18 via the second clutch C2 and the counter gear pair CG while selectively connected to the case 112 via the third brake B3. The first ring gear R1 of the first planetary gear set 26 and the first carrier CA2 of the second planetary gear set 28 are unitarily connected to each other in connection with an output gear 120 serving as an output rotary member of the automatic shifting portion 114. The second ring gear R2 of the second planetary gear set 28 is selectively connected to the case 112 via the first brake B1. The output gear 120 is held in meshing engagement with a differential gear 122 of the differential gear unit 30 (final reduction gear) 30 to transfer the drive force to the pair of drive wheels 32 in sequence via a pair of axles or the like. The counter drive gear 116 and the counter driven gear 118 are disposed on the first and second axes RC1 and RC2, respectively, to function as a connecting device for operatively connecting the power transfer member 18 to the first and second clutches C1 and C2.

In the shifting mechanism 110 of such a structure, the first switching clutch C0, the first and second clutches C1 and C2, the switching brake B0 and the first to third brake B1 to B3 are selectively caused to engage in operation in a manner as shown by, for instance, the engagement operation table shown in FIG. 12. This allows either one of the 1st-speed gear position (first gear position) to the 7th-speed gear position (seventh gear position), the reverse-running gear position (reverse-drive gear position) or the neutral position to be selectively established. Thus, the shifting mechanism 110 can have a total speed ratio $\gamma T$ (a ratio of rotation speed NIN of input shaft 14 to rotation speed NOUT of output gear 120) variable in a substantially equal ratio for each of the gear positions.

In particular, with the present embodiment, engaging any one of the switching clutch C and the switching brake B0, incorporated in the power distributing mechanism 16, results in a following structure of the differential portion 11. That is, the differential portion 11 to be placed in not only a continuously variable shifting state to act as the continuously variable transmission, but also a fixed shifting state to act as a multi-stage transmission with a fixed speed ratio. In the shifting mechanism 110, accordingly, the differential portion 11 placed in the fixed shifting state by engaging any one of the switching clutch C0 and the switching brake B0, and the automatic shifting portion 114 construct the step variable shifting state operating as the step variable transmission. The differential portion 11 placed in the continuously variable shifting state by engaging none of the switching clutch C0 and the switching brake B0, and the automatic shifting portion 114 construct the continuously variable shifting state operating as the continuously variable transmission.

During the function of the shifting mechanism 110 acting as the step-variable transmission, as shown in FIG. 12, engaging the switching clutch C0, the first clutch C1 and the first brake B1 allows the first gear position to be established with a speed ratio $\gamma T1$ lying at the maximum value of approximately, for instance, "4.241". Engaging the switching brake B0, the first clutch C1 and the first brake B1 allows the second gear position to be established with a speed ratio $\gamma T2$ of approximately, for instance, "2.986" that is less than that of the 1st-speed gear position. Engaging the switching clutch C0, the second clutch C2 and the first brake B1 allows the third gear position to be established with a speed ratio $\gamma T3$ of approximately, for instance, "2.111" that is less than that of the 2nd-speed gear position. Engaging the switching brake B0, the second clutch C2 and the first brake B1 allows the fourth gear position to be established with a speed ratio $\gamma T4$ of approximately, for instance, "1.482" that is less than that of the 3rd-speed gear position. Engaging the switching clutch C0, the first clutch C1 and the second clutch C2 allows the fifth gear position to be established with a speed ratio $\gamma T5$ of approximately, for instance, "1.000" that is less than that of the 4th-speed gear position. Engaging the switching clutch C0, the second clutch C2 and the second brake B2 allows the sixth gear position to be established with a speed ratio $\gamma T6$ of approximately, for instance, "0.657" that is less than that of the 5th-speed gear position.

Engaging the switching brake B0, the second clutch C2 and the second brake B2 allows the seventh gear position to be established with a speed ratio $\gamma T7$ of approximately, for instance, "0.463" that is less than that of the 6th-speed gear position. Further, by engaging the first clutch C1 and the third brake B3, during a drive mode of the engine 8, and engaging the first clutch C1 and the first brake B1 during another drive mode of the second electric motor M2, the reverse-drive gear position is established with a speed ratio $\gamma R$ of approximately, for instance, "1.917" lying at a value between those of the 3rd-speed and 4th-speed gear positions. In addition, when it is desired to have a neutral "N" state, only, for instance, the first clutch C1 is caused to engage.

During the function of the shifting mechanism 110 acting as the continuously variable transmission, both the switching clutch C0 and the switching brake B0, indicated on the engagement operation table shown in FIG. 12, are caused to disengage, thereby causing the differential portion 11 to function as the continuously variable transmission. This allows the automatic shifting portion 114, connected to the differential portion 11 in series, to function as a step-variable transmission with four gear positions. This results in an effect of causing the rotation speed input to the automatic shifting portion 114, i.e., the rotation speed of the power transfer member 18 to vary in a stepless fashion for each of the gear positions of the 1st-speed to 4th-speed gear positions of the automatic shifting portion 114 such that each gear position can obtain a continuously variable speed ratio width. This allows a speed ratio between adjacent gear positions to be continuously variable in a stepless fashion such that the shifting mechanism 110 can operate as a whole to have a total speed ratio $\gamma T$ in a continuously variable mode.

FIG. 13 represents a collinear chart capable of representing correlations among the rotation speeds of the rotary elements whose connecting states are different for respective gear positions in the shifting mechanism 110, composed of the differential portion 11 operative to function as the continuously-variable shifting portion or the first shifting portion, and the automatic shifting portion 114, operative to function as the step-variable shifting portion or the second shifting portion, in terms of linear lines. The rotary elements of the power distributing mechanism 16 for a phase in which the switching clutch C0 and the switching brake B0 are caused to disengage and another phase in which the switching clutch C0 or the switching brake B0 is caused to engage rotate at the same rotation speeds as those described above with reference to the first embodiment.

In the collinear chart of FIG. 13, four vertical lines Y4, Y5, Y6 and Y7 of the automatic shifting portion 114 correspond, from a left-side in order, to: the first and second sun gears S1 and S2 corresponding to the fourth rotary element RE4 (fourth element) and connected to each other; the first carrier CA1 corresponding to the fifth rotary element RE5 (fifth element); the first carrier CA1 and the first ring gear R1 corresponding to the sixth rotary element RE6 (sixth element)

and connected to each other; and the second ring gear R2 corresponding to the seventh rotary element RE7 (seventh element). With the automatic shifting portion 114, further, the fourth rotary element RE4 is selectively connected to the power transfer member 18 through the first clutch C1 and selectively connected to the case 112 through the second brake B2. In addition, the fifth rotary element RE5 is selectively connected to the power transfer member 18 through the second clutch C2 and selectively connected to the case 112 through the third brake B3. The sixth rotary element RE6 is connected to the output gear 120 of the automatic shifting portion 114, and the seventh rotary element RE7 is selectively connected to the case 112 through the first brake B1.

With the automatic shifting portion 114, the switching clutch C0, the first clutch C1 and the first brake B1 are caused to engage as shown in FIG. 13. When this takes place, the rotation speed of the output gear 120 at a first speed is represented by an intersecting point between a inclined linear line L1, passing across an intersecting point between the vertical line Y7, indicative of the rotation speed of the seventh rotary element RE7, and a horizontal line X1, and an intersecting point between the vertical line Y4 indicative of the rotation speed of the fourth rotary element RE4, and a horizontal line X2, and the vertical line Y6 indicative of the rotation speed of the sixth rotary element RE6 connected to the output gear 120. The rotation speed of the output gear 120 at a second speed is represented by an intersecting point between a inclined linear line L1, determined with the switching brake B0, the first clutch C1 and the first brake B1 being caused to engage, and the vertical line Y6 representing the rotation speed of the sixth rotary element RE6 connected to the output gear 120. The rotation speed of the output gear 120 at a fourth speed is represented by an intersecting point between a inclined linear line L4, determined with the switching brake B0, the second clutch C2 and the first brake B1 being caused to engage, and the vertical line Y6 representing the rotation speed of the sixth rotary element RE6 connected to the output gear 120.

The rotation speed of the output gear 120 at a fifth speed is represented by an intersecting point between a linear line L5, determined with the switching clutch C0, the first clutch C1 and the second clutch C2 being caused to engage, and the vertical line Y6 representing the rotation speed of the sixth rotary element RE6 connected to the output gear 120. The rotation speed of the output gear 120 at a sixth speed is represented by an intersecting point between a inclined linear line L6, determined with the switching brake B0, the second clutch C2 and the second brake B2 being caused to engage, and the vertical line Y representing the rotation speed of the sixth rotary element RE6 connected to the output gear 120.

Even with the shifting mechanism 110 of the second embodiment, as set forth above, for the shifting between the 2nd-speed gear position and the 3rd-speed gear position and the shifting between the 4th-sped gear position and the 5th-speed gear position, the downshift in one of the differential portion 11 and the automatic shifting portion 114 and the upshift in the other one of the differential portion 11 and the automatic shifting portion 114 are concurrently executed in a manner defined as "concurrent shifting". Initiating the shifting in the downshift in one of the differential portion 11 and the automatic shifting portion 114 results in an increase in the engine rotation speed while simultaneously initiating the shifting in the upshift in the other one of the differential portion 11 and the automatic shifting portion 114 results in a decrease in the engine rotation speed. Thus, it is likely that a fluctuation occurs in the engine rotation speed due to even a slight degree of difference in timing to cause a vehicle occupant to suffer gearshift shock as uncomfortable feeling.

Even with the second embodiment, the shifting mechanism 110 is comprised of the differential portion 11 and the automatic shifting portion 114, wherein the downshift in one of the differential portion 11 and the automatic shifting portion 114 and the upshift in the other one of the differential portion 11 and the automatic shifting portion 114 are executed round the same time. During such a concurrent shifting period, causing the first electric motor M1 to control the rotation speed of the second rotary element RE2 (sun gear S0) allows a shifting progress state to be properly controlled during the concurrent shifting period, resulting in the same advantageous effects as those of the first embodiment set forth above.

Unlike the shifting mechanism 10 shown in FIG. 1, the present embodiment has a layout in which none of the power distributing mechanism 16 and the automatic shifting portion 114 is disposed on a common axis. This allows the shifting mechanism 110 to have a further reduced axial dimension. This allows the shifting mechanism 110 to be suitably applied to an FF or RR vehicle in a transverse layout in which a shifting mechanism generally has an axial direction limited with a vehicle width, i.e., a shifting mechanism to be installed with the first and second axes RC1 and RC2 aligned in parallel to a vehicle widthwise direction. Further, the differential portion 11 and the automatic shifting portion 114 are disposed between the engine 8 (differential drive gear 122) and the counter gear pair CG, resulting in a further reduction in axial dimension of the shifting mechanism 110. In addition, the second electric motor M2 is disposed on the first axis RC1, resulting in a reduction in an axial dimension of the second axis RC2.

While the present invention has been described above with reference to the embodiments shown in the drawings, the present invention may be also implemented in other modes.

The present embodiment has been described above with reference to an exemplary case shown in FIGS. 9 and 10 wherein the concurrent shifting occurs in, for instance, the "2→3" upshift during the upshifting in the automatic shifting portion 20 and the downshifting in the differential portion 11. The present embodiment may be applied to another concurrent shifting in, for instance, a "4→5" upshift or another concurrent shifting in a "3→2" downshift and a "5→4" downshift initiated during the downshifting of the automatic shifting portion 20 and the upshifting of the differential portion 11. That is, the present invention may be applied to various shiftings which are executed as the concurrent shifting. Moreover, even if the shifting mechanisms 10 and 110 do not take the illustrated structures, the present invention may be applied to a vehicular drive apparatus provided that such an apparatus includes the first shifting portion and the second shifting portion with a structure in which the concurrent shifting is executed.

For instance, the differential portion 11 need not have a structure in which the step-variable shifting state and the continuously variable shifting state can be switched, and it may suffice for the transmission to have a structure to function at least as a step-variable transmission. In addition, for instance, the differential portion 11 and the automatic shifting portions 20 and 114 may be a step-variable transmission of forward-drive two stages. Moreover, while the automatic shifting portion 20 is connected to the differential portion 11 in series via the power transfer member 18, the automatic shifting portion 20 may have a layout with a structure including, for instance, a counter shaft disposed in parallel to the input shaft 14 on which the automatic shifting portion 20 is concentrically mounted. In such a case, the differential portion 11 and the automatic shifting portion 20 are connected to each other for a power transmissive state via a set of power transfer members composed of, for instance, a counter gear pair or a combination of a sprocket and chain.

With the power distributing mechanism 16 of the illustrated embodiments, the carrier CA0 is connected to the engine 8 and the sun gear S0 is connected to the first electric motor M1 while the ring gear R0 is connected to the power transfer member 18. However, the present invention is not limited to such connecting relationships and it doesn't matter if the engine 8, the first electric motor M1 and the power transfer member 18 are connected to any one of the three elements CA0, S0 and R0 of the first planetary gear set 24.

While with the illustrated embodiments, the engine 8 is directly connected to the input shaft 14, the engine 8 may be operatively connected to the input shaft 14 through, for instance, gears, a driving chain or a driving belt, etc., and no need arises for such component elements to be concentrically disposed. Further, with the illustrated embodiment shown in FIG. 11, the counter drive gear 116 and the counter driven gear 118 may be replaced by a pair sprocket wheels on which a driving chain is tensioned.

With the illustrated embodiments, further, the hydraulically operated frictional engaging devices, such as the switching clutch C0 and the switching brake B0, may be replaced by magnetic-powder type, electromagnetic type and mechanical type engaging devices such as powder (magnetic powder) clutches, electromagnetic clutches and meshing-type dog clutches or the like.

With the illustrated embodiments, furthermore, although the second electric motor M2 is connected to the power transfer member 18, the second electric motor M2 may be connected to the output shaft 22 or a rotary member of the automatic shifting portion 20 or 114.

The power distributing mechanism 16, acting as the differential mechanism of the illustrated embodiments, may be replaced by, for instance, a differential gear device having a pinion driven by the engine, and a pair of bevel gears held in meshing engagement with the pinion and operatively connected to the first electric motor M1 and the second electric motor M2.

While the power distributing mechanism 16 of the illustrated embodiments takes the form of a structure including one set of planetary gear units, the power distributing mechanism may include two or more planetary gear sets to be placed in a non-differential state (fixed speed shifting state) to function as a transmission of three stages.

It is intended that the illustrated embodiments described be considered only as illustrative of the present invention and the present invention may be implemented with various modifications or improvements apparent to those skilled in the art.

The invention claimed is:

1. A control device of a vehicular drive apparatus having a first shifting portion and a second shifting portion, both operative to perform step-variable shifting among a plurality of gear positions, and driving drive wheels by output power of an engine, wherein:
an electric motor is connected to at least one rotary element of the first shifting portion and the second shifting portion; and
during a concurrent shifting when a downshift in one of the first shifting portion and the second shifting portion and an upshift in the other of the first shifting portion and the second shifting portion are executed at the same time, a shifting progress state during the concurrent shifting is controlled by controlling a rotation speed of the rotary element so that a shifting of the first shifting portion is commenced and completed during an inertia phase in a shifting of the second shifting portion and engine rotation speeds vary in the same direction as a varying direction in conjunction with the shifting of the second shifting portion.

2. The control device of the vehicular drive apparatus according to claim 1, wherein the shifting progress state of one of the first shifting portion and the second shifting portion with respect to the state of shifting progress of the other of the first shifting portion and the second shifting portion upon the concurrent shifting is controlled by controlling the rotation speed of the electric motor.

3. The control device of the vehicular drive apparatus according to claim 1, wherein a first electric motor is connected to the rotary element of the first shifting portion as the electric motor, and the first electric motor controls the rotation speed of the rotary element in the first shifting portion.

4. The control device of the vehicular drive apparatus according to claim 3, wherein the first electric motor is controlled depending on a variation in numbers of input rotation of the second shifting portion during the concurrent shifting.

5. The control device of the vehicular drive apparatus according to claim 3, wherein
the first shifting portion and the second shifting portion are disposed in a power transfer path extended between the engine and the drive wheels;
the first shifting portion includes a differential mechanism for distributing an output of the engine to the first electric motor and an input rotary member of the second shifting portion; and
the first electric motor is controlled to allow rotation speeds of the engine to vary in the same direction as a varying direction in conjunction with the shifting of the second shifting portion during the concurrent shifting.

6. The control device of the vehicular drive apparatus according to claim 1, wherein the first shifting portion and the second shifting portion are disposed in a power transfer path extended between the engine of the vehicle and the drive wheels, and the electric motor is controlled to allow rotation speeds of the engine to vary in the same direction as a varying direction in conjunction with the shifting of the second shifting portion during the concurrent shifting.

7. The control device of the vehicular drive apparatus according to claim 6, wherein output torque of the engine is temporarily caused to drop during an inertia phase of the shifting of the second shifting portion.

8. The control device of the vehicular drive apparatus according to claim 1, wherein the shifting of the second shifting portion is a clutch-to-clutch shifting accomplished by disengaging a disengaging-side engaging device and engaging an engaging-side engaging device.

9. The control device of the vehicular drive apparatus according to claim 1, wherein the first shifting portion is operative to act as an electrically controlled continuously variable transmission in which controlling an operating state of the electric motor connected to the first shifting portion controls a differential state between an input rotation speed and an output rotation speed.

10. The control device of the vehicular drive apparatus according to claim 9, wherein a shifting progress state in the concurrent shifting is controlled using the electric motor connected to the first shifting portion.

11. The control device of the vehicular drive apparatus according to claim 1, wherein
the vehicle includes the engine, a first electric motor, and a power transfer member connecting the first shifting portion and second shifting portion; and the first shifting portion is a differential portion including a differential mechanism having a first element connected to the engine, a second element connected to the first electric motor, and a third element connected to the power transfer member, and distributing an output of the engine to the first electric motor and the power transfer member.

12. The control device of the vehicular drive apparatus according to claim 11, wherein the differential portion is operative to act as a continuously variable transmission by controlling an operating state of the first electric motor.

13. The control device of the vehicular drive apparatus according to claim 11, wherein the differential mechanism is constructed of a planetary gear unit having three rotary elements operative to rotate relative to each other, and the first shifting portion includes an engaging device operative to allow one of the three rotary elements to be selectively connected to a non-rotary member and to cause two of the rotary elements to be selectively connected to each other.

14. The control device of the vehicular drive apparatus according to claim 11, wherein the differential mechanism includes a friction engaging device for selectively switching the differential mechanism into a differential state and a non-differential state.

15. The control device of the vehicular drive apparatus according to claim 11, wherein
the second shifting portion is constructed of an automatic shifting portion of which shifting is automatically controlled; and
an overall speed ratio of the drive apparatus is established based on a speed ratio of the differential portion and a speed ratio of the automatic shifting portion.

16. The control device of the vehicular drive apparatus according to claim 1, further comprising
concurrent shifting determining means that determines if execution of the concurrent shifting in which a downshift in one of the first shifting portion and the second shifting portion and an upshift in the other of the first shifting portion and the second shifting portion are executed substantially at the same time;
second-shifting-portion control means that causes the second shifting portion to execute a shifting when the concurrent shifting determining means determines presence of the concurrent shifting;
inertia-phase determining means that determines presence of an inertia phase caused by the shifting of the second shifting portion; and
first-shifting-portion control means that causes the first shifting portion to complete a shifting thereof during a time period in which the inertia-phase determining means determines presence of the inertia phase caused by the shifting of the second shifting portion.

17. The control device of the vehicular drive apparatus according to claim 16, wherein an engaging element in the first shifting portion used for the concurrent shifting is commonly used as an engaging element for limiting a differential action of the first shifting portion.

18. The control device of the vehicular drive apparatus according to claim 16, wherein the concurrent shifting are executed in a high-torque operating region in which output torque of the second shifting portion exceeds a predetermined high-output running-region determining value.

* * * * *